United States Patent
Forsythe et al.

(10) Patent No.: US 9,550,703 B2
(45) Date of Patent: Jan. 24, 2017

(54) GRANULATION METHOD AND SYSTEM

(71) Applicant: Forsythe and Long Engineering, Inc., Florence, AL (US)

(72) Inventors: Phillip Forsythe, Florence, AL (US); Christopher Jones, Saint Joseph, TN (US); Joshua Green, Waterloo, AL (US)

(73) Assignee: Nous, LLC, Florence, AL (US)

( * ) Notice: Subject to any disclaimer, the term of this patent is extended or adjusted under 35 U.S.C. 154(b) by 418 days.

(21) Appl. No.: 14/189,176

(22) Filed: Feb. 25, 2014

(65) Prior Publication Data

US 2014/0245803 A1    Sep. 4, 2014

Related U.S. Application Data

(60) Provisional application No. 61/771,256, filed on Mar. 1, 2013.

(51) Int. Cl.

| | | |
|---|---|---|
| *B01J 2/00* | (2006.01) | |
| *C09C 1/58* | (2006.01) | |
| *C05D 1/02* | (2006.01) | |
| *C05G 3/00* | (2006.01) | |
| *C05C 3/00* | (2006.01) | |
| *C05D 1/00* | (2006.01) | |
| *C05D 5/00* | (2006.01) | |

(52) U.S. Cl.
CPC ............... *C05G 3/0058* (2013.01); *B01J 2/00* (2013.01); *C05C 3/005* (2013.01); *C05D 1/005* (2013.01); *C05D 1/02* (2013.01); *C05D 5/00* (2013.01); *C09C 1/58* (2013.01)

(58) Field of Classification Search
None
See application file for complete search history.

(56) References Cited

U.S. PATENT DOCUMENTS

| | | | |
|---|---|---|---|
| 3,711,254 A | | 1/1973 | McGowan et al. |
| 3,853,490 A | * | 12/1974 | Boeglin .................... B01J 2/12 23/300 |
| H1070 H | | 7/1992 | Harrison et al. |
| 5,460,765 A | * | 10/1995 | Derdall ................ C05G 3/0058 23/313 P |

(Continued)

OTHER PUBLICATIONS

Canadian Office Action, dated Sep. 1, 2015, pp. 1-3, issued in Canadian Patent Application No. 2,844,198, Canadian Intellectual Property Office, Gatineau, Quebec, Canada.

*Primary Examiner* — Wayne Langel
(74) *Attorney, Agent, or Firm* — Brinks Gilson & Lione

(57) ABSTRACT

A granulation method may include feeding a graded powder into a granulator. The powder may have a particle size distribution (PSD) of at least 98% −115 mesh and at most 50% −200 mesh. The powder may have a PSD of at least 98% less than or equal to 4.2% of a median product particle size and at most 50% less than or equal to 2.5% of the median product particle size. The powder may have a PSD of between 40% and 80% between 3% and 6% of the median product particle size, between 5% and 30% between 2% and 4% of the median product particle size, and between 10% and 40% between 1% and 3% of the median product particle size. A liquid binder may be fed into the granulator. Wet granules may be discharged from the granulator and may have a moisture content of between 7% and 12%.

21 Claims, 12 Drawing Sheets

(56) References Cited

U.S. PATENT DOCUMENTS

| | | | | |
|---|---|---|---|---|
| 6,013,209 A * | 1/2000 | Phinney | ..................... | B01J 2/00 |
| | | | | 23/313 P |
| 6,132,484 A * | 10/2000 | Phinney | ............... | C05G 3/0058 |
| | | | | 23/293 S |
| 6,270,708 B1 * | 8/2001 | Gurol | ..................... | B02C 13/18 |
| | | | | 264/117 |
| 6,331,193 B1 * | 12/2001 | Phinney | ..................... | B01J 2/14 |
| | | | | 23/313 P |
| 6,454,979 B1 * | 9/2002 | Phinney | ..................... | B01J 2/14 |
| | | | | 23/313 P |
| 6,464,746 B2 | 10/2002 | Neyman et al. | | |
| 6,582,637 B1 * | 6/2003 | Phinney | .................. | A01C 1/06 |
| | | | | 264/117 |
| 6,805,821 B2 * | 10/2004 | Phinney | .................. | C05C 11/00 |
| | | | | 23/313 P |
| 7,867,947 B1 | 1/2011 | Devic et al. | | |
| 7,910,030 B2 * | 3/2011 | Remon | ................ | A61K 9/1623 |
| | | | | 264/109 |

* cited by examiner

GRANULATION METHOD AND SYSTEM

CROSS-REFERENCE TO RELATED APPLICATIONS

This application relates to and claims all benefit of U.S. Provisional Application Ser. No. 61/771,256 filed Mar. 1, 2013.

TECHNICAL FIELD

This disclosure relates to granulation methods and systems. More particularly, this disclosure relates to methods and systems for granulating one or more particulate materials to form granules.

BACKGROUND

Granulation typically involves combining multiple smaller particles with one another to form a larger particle, or granule. This process may be referred to as particle size enlargement or agglomeration. Granulation may be used to form particles having improved bulk density and/or hardness or to form particles having a modified shape. The smaller particles may be bonded to one another during the granulation process to form the granule. The smaller particles may be bonded by compression and/or using a bonding agent.

When different materials having dissimilar particle sizes are blended with one another, there may be a tendency for segregation of the mixture. For example, the smaller and/or more dense particles may tend to move toward the bottom of the container or vessel, while the larger and/or less dense particles may tend to move toward the top of the container or vessel. The particle size of one or more of the materials may be adjusted by granulation so that the particle sizes of the different materials become similar. Upon blending the different materials with similar particle sizes, the tendency for the mixture to segregate may be reduced.

Materials having particularly small particle sizes and/or irregular shaped particles may not flow well, which may make it difficult to transport and/or store the materials. Using granulation, the particle size of the materials may be increased and/or the shape of the particles may be modified to simplify transportation and/or storage of the materials.

SUMMARY

The present embodiments provide granulation methods and systems.

In one example, a granulation method may include feeding a graded powder into a granulator. The graded powder may have a particle size distribution of at least about 98% −115 mesh and at most about 50% −200 mesh. A liquid binder may be fed into the granulator. Wet granules may be discharged from the granulator. The wet granules may have a moisture content of between about 7% and about 12%.

In another example, a granulation method may include feeding a graded powder into a granulator. The graded powder may have a particle size distribution of between about 40% and about 80% −100 +150 mesh, between about 5% and about 30% −150 +200 mesh, and between about 10% and about 40% −200 +325 mesh. A liquid binder may be fed into the granulator. Wet granule material may be discharged from the granulator.

In another example, a granulation system may include a granulator. A powder storage unit may be configured to feed a graded powder into the granulator. A liquid binder supply unit may be configured to feed a liquid binder into the granulator. The granulator may be configured to contact the graded powder and the liquid binder with one another to form a wet granule material. A screening unit may be configured to screen the wet granule material. A drying unit may be positioned downstream of the screening unit and configured to dry at least a portion of the wet granule material to form a dry granule material.

In another example, a granulation method for producing product granules having a median product particle size may include feeding a graded powder into a granulator. The graded powder may have a particle size distribution of at least about 98% less than or equal to about 4.2% of the median product particle size and at most about 50% less than or equal to about 2.5% of the median product particle size. A liquid binder may be fed into the granulator. Wet granules may be discharged from the granulator. The wet granules may have a moisture content of between about 7% and about 12%.

In another example, a granulation method for producing product granules having a median product particle size may include feeding a graded powder into a granulator. The graded powder may have a particle size distribution of between about 40% and about 80% between about 3% and about 6% of the median product particle size, between about 5% and about 30% between about 2% and about 4% of the median product particle size, and between about 10% and about 40% between about 1% and about 3% of the median product particle size. A liquid binder may be fed into the granulator. A wet granule material may be discharged from the granulator.

BRIEF DESCRIPTIONS OF THE DRAWINGS

DETAILED DESCRIPTION OF THE DRAWINGS AND THE PRESENTLY PREFERRED EMBODIMENTS

Figure 1:
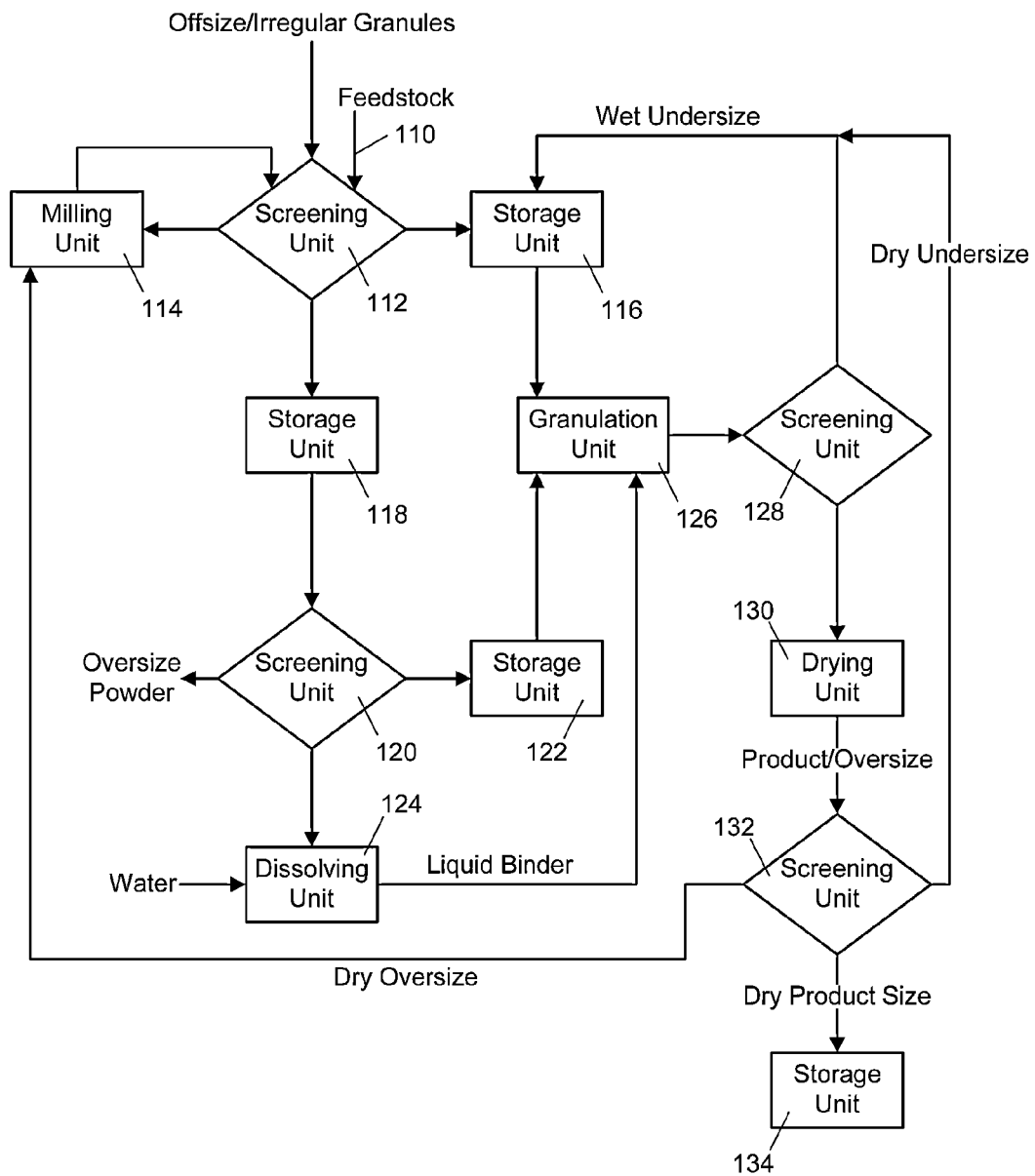
FIG. 1 illustrates a process flow diagram of one example of a system for granulating a particulate material.

For the purposes of promoting an understanding of the principles of the present disclosure, reference will now be made to the embodiments illustrated in the drawings, and specific language will be used to describe the same. Moreover, in the figures, like-referenced numerals designate corresponding parts throughout the different views.

The present disclosure relates to granulation methods and systems. The embodiments described in this disclosure will be discussed generally in relation to methods and systems for granulating particulate materials including one or more of nitrogen, phosphorus, and/or potassium such as, for example, potassium chloride, or muriate of potash (MOP), to form fertilizer granules, but the disclosure is not so limited. The granulation methods and systems may be used for granulating any suitable particulate material including, for example, sulfates (e.g., potassium sulfate), chlorides (e.g., sodium chloride or ammonium chloride), carbonates (e.g., magnesium carbonate or sodium carbonate), phosphates, sulfur, potash, kaolin, and magnesia. The granulation systems and methods may be used generally for granulating any one or more water soluble bulk solid materials. The bulk solid materials may have a high melting point. For example, the bulk solid materials may have a melting point of greater than about 250° F., greater than about 325° F., greater than about 350° F., or greater than about 375° F. Additionally, or alternatively, the bulk solid materials may have a solubility of less than about 40% or less than about 35% in water at standard temperature and pressure.

The methods and systems described herein may be used to produce solid, round (e.g., spherical), free-flowing fertilizer granules of any nitrogen, phosphorus, and/or potassium (NPK) combination with superior hardness, durability, blendability, and/or coatability. This may be achieved by agglomeration granulation in which a graded powder mix of selected fertilizer components is contacted with a liquid binder in the granulation zone of a pan granulator. The powder mix may include particle sizes between 50 mesh and 325 mesh. The powder mix may include large aggregates, small aggregates, and micro aggregates in specified ratios to create a tightly packed mass, which is bound together during the granulation process. The fertilizer powder mix may be graded so that there are large aggregates, small aggregates, and micro aggregates, which may be bound together by a binder solution. The graded powder mix and the binder solution may combine to form a "concrete granule" as further described below. Additionally, or alternatively, the graded powder mix and the binder solution may combine on the surfaces of seed particles to form a "concrete layer" on the seed particles as further described below. The seed particles may include particle sizes between 5 mesh and 50 mesh. This "concrete" may enable the product to have a high crush strength which in turn gives the granule great durability. The close packing of aggregate may enable the surface of the granules to be extremely smooth and uniform which lends itself to be superiorly coatable. This fertilizer may be easily blended with other granular fertilizers because of the superior size uniformity and sphericity.

FIG. 1 illustrates a process flow diagram of one example of a system 100 for granulating a particulate material. A particulate feedstock may be introduced into the system 100 at a feed line 110. The feedstock may include particulate material to be granulated. In one example, the particulate material may include MOP. In other examples, the particulate material may include other fertilizer components (e.g., compounds including nitrogen, phosphorus, and/or potassium) or any other materials to be granulated (e.g., any other water soluble bulk solid material).

The feedstock may be fed via the feed line 110 to a screening unit such as a feed screener 112. The feed screener 112 may classify the feedstock based on particle size. In other words, the feed screener 112 may separate the feedstock into two or more portions having different particle sizes. To that end, the feed screener 112, or any other screener or screening unit described herein, may be configured as any type of screening or classifying unit such as, for example, a shaker, a vibrating classifier, a vibrating screener, or an air classification unit. In one example, the feed screener 112 may separate the feedstock into three portions (e.g., oversize feedstock, seed material, and undersize feedstock) as shown in FIG. 1. Off size and/or irregular granules may be fed to the feed screener 112 as shown in FIG. 1. The off size and/or irregular granules may be fed to the feed screener 112 with the feedstock or separately from the feedstock.

Oversize feedstock may be fed to a mill 114. The oversize feedstock may include particles having a size of about +8 mesh. The mill 114 may reduce the particle size of the oversize feedstock (e.g., by milling, grinding, and/or crushing). To that end, the mill 114 or any other mill or milling unit described herein, may be configured as any suitable type of milling unit such as, for example, a hammer mill, a ball mill, a conical mill, a disk mill, a jet mill, or a roll crusher. Milled feedstock may exit the mill 114 and be fed to the feed screener 112. In this manner, the oversize feedstock may be milled and returned to the feed screener 112 for further processing.

The particle size of the oversize feedstock may be based on the desired particle size of the finished product granules. For example, the oversize feedstock may have a particle size of at least about 79% of the particle size of the finished product granules. In one example, the particle size of the finished product granules may be about 3 mm. The oversize feedstock may have a particle size of at least about 2.37 mm. The particle size of the oversize feedstock and/or the particle size of the finished product granules may be a median particle size. Additionally, or alternatively, the oversize feedstock may have a particle size distribution of at least about 75% greater than or equal to about 79% of the particle size of the finished product granules, typically at least about 80% greater than or equal to about 79% of the particle size of the finished product granules.

Seed material may exit the feed screener 112 and be fed to a seed storage unit 116 for further processing as described below. The seed material may include particles having a size of about −5 +50 mesh, typically about −8 +24 mesh. In one example, the seed material may have a particle size distribution of at least about 97% −8 mesh. Additionally, or alternatively, the seed material may have a particle size distribution of at most about 16% −14 mesh. Additionally, or alternatively, the seed material may have a particle size distribution of at most about 7% −16 mesh. Additionally, or alternatively, the seed material may have a particle size distribution of at least about 75% −8 +14 mesh, typically at least about 80% −8 +14 mesh. Throughout this disclosure, particle size distribution may refer to the weight of particles having a specified size or to a weight percent of particles having a specified size relative to the total weight of the particles.

The particle size of the seed material may be based on the desired particle size of the finished product granules. For example, the seed material may have a particle size of between about 45% and about 80% of the particle size of the finished product granules. In one example, the particle size of the finished product granules may be about 3 mm. The seed material may have a particle size of between about 1.35 mm and about 2.4 mm. The particle size of the seed material and/or the particle size of the finished product granules may be a median particle size. Additionally, or alternatively, the seed material may have a particle size distribution of at least about 75% between about 45% and about 80% of the particle size of the finished product granules, typically at least about 80% between about 45% and about 80% of the particle size of the finished product granules.

Undersize feedstock may exit the feed screener 112 and be fed to a fines screener 120. In one example, the system 100 may include an undersize feedstock storage unit 118 disposed between the feed screener 112 and the fines screener 120 as shown in FIG. 1. The undersize feedstock may exit the feed screener 112 and be fed to the undersize feedstock storage unit 118, which may include a tank or a vessel for storing the undersize feedstock. The undersize feedstock may exit the undersize feedstock storage unit 118 and be fed to the fines screener 120. The undersize feedstock may include particles having a size of about −20 mesh.

The fines screener 120 may classify the undersize feedstock based on particle size. In one example, the fines screener 120 may separate the undersize feedstock into three portions (e.g., oversize powder, graded powder and fines) as shown in FIG. 1. Oversize powder may exit the fines screener 120 and be further processed. For example, the oversize powder may be dissolved for use as a component of the liquid binder as further described below with reference to the fines. Additionally, or alternatively, the oversize powder may be fed to the mill 114 or another milling unit to reduce the particle size of the oversize powder. Additionally, or alternatively, the oversize powder may be fed to the feed screener 112. In any of the examples described herein, the oversize powder may be fed to an oversize powder storage unit for further processing.

Graded powder may exit the fines screener 120 and be fed to a powder storage unit 122 for further processing as described below. The graded powder may include particles having a size of about −100 +325 mesh. In one example, the graded powder may have a particle size distribution of at least about 98% −115 mesh. Additionally, or alternatively, the graded powder may have a particle size distribution of at most about 50% −200 mesh, typically at most about 31% −200 mesh, preferably at most about 25% −200 mesh.

The particle size of the graded powder may be based on the desired particle size of the finished product granules as further described below. In one example, the graded powder may have a particle size distribution of at least about 98% less than or equal to about 4.2% of the particle size of the finished product granule. Additionally, or alternatively, the graded powder may have a particle size distribution of at most about 50% less than or equal to about 2.5% of the particle size of the finished product granule, typically at most about 31% less than or equal to about 2.5% of the particle size of the finished product granule, preferably at most about 25% less than or equal to about 2.5% of the particle size of the finished product granule.

The graded powder may be a graded powder mix including large aggregate, small aggregate, and micro aggregate. For example, the graded powder may include between about 40% and about 80%, typically between about 57% and about 67% large aggregate; between about 5% and about 30%, typically between about 7% and about 17% small aggregate; and between about 10% and about 40%, typically between about 21% and about 31% micro aggregate. The large aggregate may have a particle size distribution of at least about 90% −100+150 mesh, typically at least about 98% −100 +150 mesh, preferably 100% −100 +150 mesh. Additionally, or alternatively, the small aggregate may have a particle size distribution of at least about 90% −150 +200 mesh, typically at least about 98% −150 +200 mesh, preferably 100% −150+200 mesh. Additionally, or alternatively, the micro aggregate may have a particle size distribution of at least about 90% −200 +325 mesh, typically at least about 98% −200 +325 mesh, preferably 100% −200 +325 mesh. In this manner, the graded powder may have a particle size distribution of between about 40% and about 80%, typically between about 57% and about 67% −100 +150 mesh; between about 5% and about 30%, typically between about 7% and about 17% −150 +200 mesh; and between about 10% and about 40%, typically between about 21% and about 31% −200 +325 mesh. The use of graded powder including large aggregate, small aggregate, and micro aggregate in predetermined proportions may aid in producing a granule having desirable properties (e.g., bulk density, hardness, sphericity, durability, blendability, and/or coatability) as further described below.

The particle size of the graded powder may be based on the desired particle size of the finished product granules. For example, the graded powder may have a particle size of between about 1% and about 6% of the particle size of the finished product granules. In one example, the particle size of the finished product granules may be about 3 mm. The graded powder may have a particle size of between about 0.03 mm and about 0.18 mm. The particle size of the graded powder and/or the particle size of the finished product granules may be a median particle size. Additionally, or alternatively, the graded powder may have a particle size distribution of at least about 75% between about 1% and about 6% of the particle size of the finished product granules, typically at least about 80% between about 1% and about 6% of the particle size of the finished product granules.

The graded powder may include large aggregate, small aggregate, and micro aggregate as described above. The relative sizes of the large aggregate, small aggregate, and micro aggregate may be based on the desired particle size of the finished product granules. For example, the large aggregate may have a particle size of between about 3% and about 6% of the particle size of the finished product granules. In one example, the particle size of the finished product granules may be about 3 mm. The large aggregate may have a particle size of between about 0.09 mm and about 0.18 mm. The particle size of the large aggregate and/or the particle size of the finished product granules may be a median particle size. Additionally, or alternatively, the large aggregate may have a particle size distribution of at least about 90% between about 3% and about 6% of the particle size of the finished product granules, typically at least about 98% between about 3% and about 6% of the particle size of the finished product granules.

Additionally, or alternatively, the small aggregate may have a particle size of between about 2% and about 4% of the particle size of the finished product granules. In one example, the particle size of the finished product granules may be about 3 mm. The small aggregate may have a particle size of between about 0.06 mm and about 0.12 mm. The particle size of the small aggregate and/or the particle size of the finished product granules may be a median particle size. Additionally, or alternatively, the small aggregate may have a particle size distribution of at least about 90% between about 2% and about 4% of the particle size of the finished product granules, typically at least about 98% between about 2% and about 4% of the particle size of the finished product granules.

Additionally, or alternatively, the micro aggregate may have a particle size of between about 1% and about 3% of the particle size of the finished product granules. In one example, the particle size of the finished product granules may be about 3 mm. The micro aggregate may have a particle size of between about 0.03 mm and about 0.09 mm. The particle size of the micro aggregate and/or the particle size of the finished product granules may be a median particle size. Additionally, or alternatively, the micro aggregate may have a particle size distribution of at least about 90% between about 1% and about 3% of the particle size of the finished product granules, typically at least about 98% between about 1% and about 3% of the particle size of the finished product granules.

The graded powder may have a particle size distribution of between about 40% and about 80%, typically between about 57% and about 67% between about 3% and about 6% of the particle size of the finished product granules; between about 5% and about 30%, typically between about 7% and about 17% between about 2% and about 4% of the particle size of the finished product granules; and between about 10% and about 40%, typically between about 21% and about 31% between about 1% and about 3% of the particle size of the finished product granules.

Figure 2:
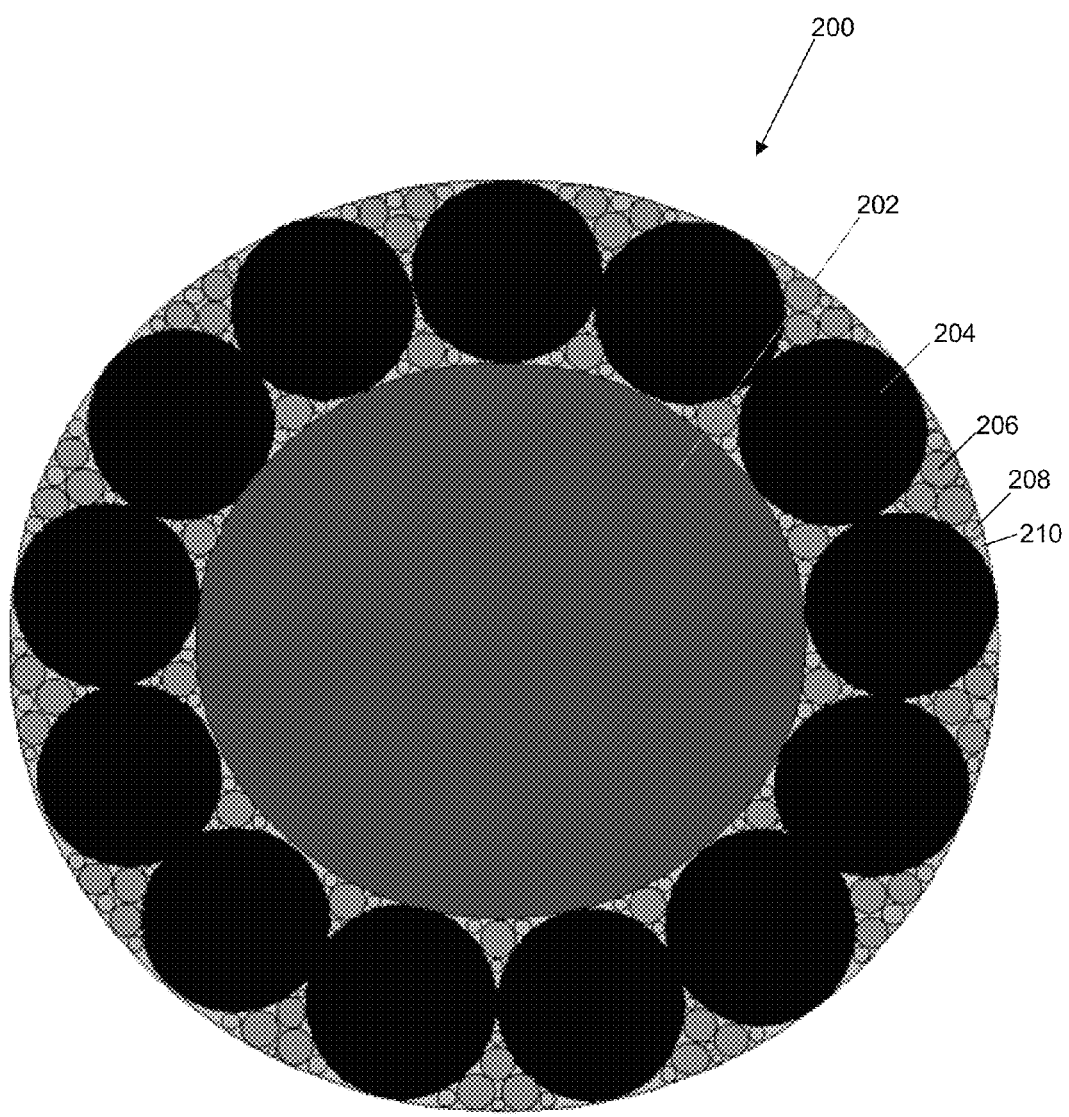
FIG. 2 illustrates one example of a granule.

FIG. 2 illustrates one example of a granule 200, which may be produced as described herein. The granule 200 may include a seed particle 202, large aggregate 204, small aggregate 206, micro aggregate 208, and binder 210. The use of graded powder including large aggregate, small aggregate, and micro aggregate in predetermined proportions may enable production of a "concrete granule." The graded powder may act as the "concrete." The "concrete" may include an improved mixture of powder sizes compared to conventional granulation processes. For example, the graded powder may have a particle size distribution having a relatively large amount of large aggregate (e.g., −100 +150 mesh material). The large aggregate may be blended with small aggregate (e.g., −150 +200 mesh material) and micro aggregate (e.g., −200 +325 mesh material). When large aggregate particles are next to each other, voids may be formed between adjacent large aggregate particles. These voids may be filled with small aggregate as shown in FIG. 2. In this manner, the voids may be made effectively smaller. The smaller voids may be filled with micro aggregate also as shown in FIG. 2. The binder solution may act as the "cement" to bind the "concrete" together. This filling of voids in combination with the use of a saturated solution may enable the granules to be effectively free of voids. This blended powder mix may act as a concrete mix in which the coarse aggregate is supported by the smaller aggregate and the smaller aggregate is supported by an even smaller aggregate, with the various aggregates bound together by the cement. The strength of the concrete may be a result of the aggregates carrying the weight instead of the cement. This close intramolecular bonding may enable the granules to have superior physical properties such as, for example, hardness, density, and surface smoothness when compared to conventional granules. Although a smaller powder blend (e.g., having a particle size distribution of less than 15% +200 mesh, 20-30%+325 mesh, and 70-80% −325 mesh) may be capable of producing a smooth granule, such a granule may lack the strength of a graded powder blend granule as described herein.

Returning to FIG. 1, fines may exit the fines screener 120 and be fed to a fines dissolving unit 124. The fines may include particles having a size of about −325 mesh. The particle size of the fines may be based on the desired particle size of the finished product granules. For example, the fines may have a particle size of at most about 1.5% of the particle size of the finished product granules. In one example, the particle size of the finished product granules may be about 3 mm. The fines may have a particle size of at most about 0.045 mm. The particle size of the fines and/or the particle size of the finished product granules may be a median particle size. Additionally, or alternatively, the fines may have a particle size distribution of at least about 75% less than or equal to about 1.5% of the particle size of the finished product granules, typically at least about 80% less than or equal to about 1.5% of the particle size of the finished product granules.

Water may be added to the fines dissolving unit 124 to produce a liquid binder. The liquid binder may be produced by dissolving the fines in the water in the fines dissolving unit 124. In this manner, the liquid binder may be a solution of the feedstock material in water (e.g., a solution of MOP in water). In one example, the liquid binder may be a saturated solution of the feedstock material in water (e.g., a saturated MOP solution). In any of the examples described herein, the liquid binder may be a solution including any suitable water soluble bulk solid material, preferably the feedstock material. Use of a saturated solution may aid in producing a granule having desirable properties (e.g., hardness) as further described below. The fines dissolving unit 124 may include a tank or vessel to store the liquid binder for further processing as described below.

In other examples, the liquid binder may consist of water (e.g., water without any solute) or may include any suitable solution. For example, the liquid binder may include a solute other than the feedstock material. To that end, the fines dissolving unit 124 may be omitted, and the system may include a liquid binder storage unit configured to store the liquid binder material and introduce the liquid binder material to the granulator. The liquid binder may include, for example, lignins, saturated salts, starches, water, or combinations thereof. The liquid binder may be selected based on the characteristics of the feedstock material (e.g., the fertilizer components) being used and/or the desired characteristics of the final product.

In one example, the preferred binder may be a saturated salt solution. The saturated solution may enable the granules to have very high crush strengths. For example, performing otherwise identical granulation processes using water vs. saturated solution as the liquid binder shows crush strengths of the granules produced using saturated solution to be approximately double that of the granules produced using water. The saturated solution may cause the aggregate material to bind more effectively and/or reduce pores when the product is dried. Without wishing to be bound by theory, it is believed that use of a highly saturated solution as the liquid binder enables the high strength values because the saturated solution binds each individual powder crystal together in an ionic bonded crystal lattice and/or binds the powder to the seed crystal in a similar manner. This may provide granule crush strengths of at least about 9 lb, typically between about 9 lb and about 11 lb measured using 3 mm particles.

The seed material (e.g., from the seed storage unit 116), the graded powder (e.g., from the powder storage unit 122), and the liquid binder (e.g., from the fines dissolving unit 124) may be fed to a granulator 126. To that end, the seed storage unit 116 may include a tank or vessel to hold the seed material and a conveying system (e.g., a weigh belt feeder) to convey the seed material to the granulator 126. Additionally, or alternatively, the powder storage unit 122 may include a tank or vessel to hold the graded powder and a conveying system (e.g., a screw feeder) to convey the graded powder to the granulator 126. Additionally, or alternatively, the fines dissolving unit 124, or other liquid binder supply unit, may include a tank or vessel to hold the liquid binder and a pump to pump the liquid binder to the granulator 126. The granulator 126 will generally be described herein as a pan granulator. However, any suitable type of granulator (e.g., a drum granulator, a pug mill, or a pin mill) may be used instead of or in addition to the pan granulator. In other examples, the seed material may be omitted, and the granules may be formed without seed material using the graded powder and the liquid binder.

The seed material may be discharged into a granulation zone of the granulator 126. Additionally, or alternatively, the seed material may be discharged into the pan behind a scraper. A feed rate of the seed material into the granulator 126 may be between about 0.5 and about 3 times a feed rate of the liquid binder into the granulator.

The graded powder may be discharged into the granulation zone of the granulator 126. The seed material and the graded powder may be discharged into the granulator 126 at the same or different positions. A feed rate of the graded powder into the granulator 126 may be between about 3 and about 8 times a feed rate of the liquid binder into the granulator.

The liquid binder may be introduced into the granulation zone of the granulator 126. The liquid binder may be introduced into the granulator 126 in any suitable manner. For example, the liquid binder may be sprayed into the granulation zone of the granulator 126 using any suitable type of spray nozzles. The liquid binder may be introduced into the granulator 126 at a temperature between about 70° F. and about 250° F., typically between about 200° F. and about 240° F. To that end, the fines dissolving unit 124 may include a heating unit to control the temperature of the liquid binder. In one example, the fines dissolving unit 124 may include a heated spray pot. The feed rate of the liquid binder into the granulator 126 may be sufficient to achieve a granule moisture content of between about 1% and about 25%, generally between about 5% and about 13%, typically between about 7% and about 12%.

Undersize recycle material may be discharged into the granulator 126. For example, wet undersize recycle material may be discharged directly into the granulator 126 at any suitable location. Additionally, or alternatively, dry undersize recycle material may be discharged directly into the granulator 126 at any suitable location. Additionally, or alternatively, the wet undersize recycle material and/or the dry undersize recycle material may be discharged into the seed storage unit 116 and fed to the granulator 126 with the seed material as shown in FIG. 1. Additionally, or alternatively, the wet undersize recycle material may be discharged into a wet recycle storage unit (not shown). The wet recycle storage unit may include a vessel (e.g., a tank or a hopper) and/or a conveying unit (e.g., a weigh belt feeder or screw feeder). The wet undersize recycle material may be metered from the wet recycle storage unit and fed to the granulator 126 separately from the seed material.

The seed material, the graded powder, the liquid binder, and/or the undersize recycle material may be contacted with one another in the rotating pan of the granulator 126 to form wet granules. The level in the pan of the granulator 126 may build until wet granules are discharged from the pan (e.g., until the wet granules overflow the wall of the pan). The wet granule material exiting the pan of the granulator 126 may have a moisture content of between about 1% and about 25%, typically between about 7% and about 12%. A reduced moisture content of the wet granule material may enable less energy to be used for drying as further described below. This may aid in providing a relatively energy efficient process when compared to conventional granulation systems. Additionally, or alternatively, the pan may be run at any suitable speed such as, for example, between about 15 rpm and about 30 rpm. Additionally, or alternatively, the pan may be run at any suitable angle such as, for example, between about 50° and about 60°.

The method of particle growth in the granulator may be referred to as an agglomeration process. Agglomeration may include the buildup of particles on each other and/or onto hard surfaces. Small, thin, multiple layers of particulate material (e.g., graded powder or any other feedstock material powder), may build up on the surfaces of the seed particles with the help of the binder solution in the granulation zone of the pan granulator to form a concrete layer as described above. The binder solution may include an MOP solution as described above to form a concrete layer consisting solely of MOP and water. Alternatively, the binder solution may include any other suitable materials to form a concrete layer including those materials. In any of the examples described herein, the use of seed is optional. The rolling of the particles along the back wall of the pan may cause the particles to become extremely spherical and densely packed. Once particles are formed to a desirable size, the particles may be discharged over the edge of the pan granulator.

The wet granule material may exit the granulator 126 and be fed to a screening unit such as a wet granule screener 128. The wet granule screener 128 may classify the wet granule material based on particle size. In one example, the wet granule screener 128 may separate the wet granule material into two portions (e.g., undersize wet granule material and product/oversize wet granule material) as shown in FIG. 1. The undersize wet granule material may include particles having a size of about −8 mesh. Additionally, or alternatively, the particle size of the undersize wet granule material may be based on the desired particle size of the finished product granules. For example, the undersize wet granule material may have a particle size of at most about 80% of the particle size of the finished product granules. In one example, the particle size of the finished product granules may be about 3 mm. The undersize wet granule material may have a particle size of at most about 2.4 mm. The particle size of the undersize wet granule material and/or the particle size of the finished product granules may be a median particle size. Additionally, or alternatively, the undersize wet granule material may have a particle size distribution of at least about 75% less than or equal to about 80% of the particle size of the finished product granules, typically at least about 80% less than or equal to about 80% of the particle size of the finished product granules.

Producing the wet granules as described herein may enable the wet granules to have increased hardness and/or strength compared to conventional wet granules. This may enable screening of the wet granules to separate the undersize wet granule material and the product/oversize wet granule material from one another. In other words, the increased hardness and/or strength of the wet granules may enable the wet granules to be screened without causing substantial damage to the wet granules and/or fouling the screening unit. The undersize wet granule material may exit the wet granule screener 128 and be fed to the granulator 126 and/or the wet recycle storage unit as wet undersize recycle material as described above.

The product/oversize wet granule material may exit the wet granule screener 128 and be fed to a drying unit 130. The product/oversize wet granule material may include particles having any size that is larger than the desired product size. In one example, the product/oversize wet granule material may have a particle size distribution of at least about 75% −4 mesh. Additionally, or alternatively, the product/oversize wet granule material may have a particle size distribution of at most about 15% −8 mesh, typically at most about 10% −8 mesh, preferably at most about 5% −8 mesh.

The particle size of the product/oversize wet granule material may be based on the desired particle size of the finished product granules. For example, the product/oversize wet granule material may have a particle size of between about 79% and about 160% of the particle size of the finished product granules. In one example, the particle size of the finished product granules may be about 3 mm. The product/oversize wet granule material may have a particle size of between about 2.3 mm and about 4.8 mm. The particle size of the product/oversize wet granule material and/or the particle size of the finished product granules may be a median particle size. Additionally, or alternatively, the product/oversize wet granule material may have a particle size distribution of at least about 75% between about 79% and about 160% of the particle size of the finished product granules, typically at least about 80% between about 79% and about 160% of the particle size of the finished product granules.

The drying unit 130 may reduce the moisture content of the wet granules to produce dry granules. To that end, the drying unit 130 may be configured as any suitable type of dryer (e.g., a rotating drum dryer, a flash dryer, a fluid bed dryer, or a tray dryer). The product/oversize wet granule material may be fed directly from the wet granule screener 128 to the drying unit 130 without any additional processing. For example, the product/oversize wet granule material may be fed directly from the wet granule screener 128 to the drying unit 130 via a conveying unit without passing through any type of rotary drum, mixer, or any other processing unit. The dry granule material exiting the drying unit 130 may have a moisture content of less than about 0.5%, typically less than about 0.1%.

Screening the wet granules prior to drying may aid in reducing the energy consumption of the system 100. For example, by removing the undersize wet granules prior to feeding the product/oversize wet granules to the drying unit 130 (e.g., by positioning the drying unit downstream of the wet granule screener 128), the amount of material passing through the drying unit may be reduced relative to a system in which all of the wet granules exiting the granulator are fed to the drying unit. In other words, because the wet undersize recycle material does not pass through the drying unit 130, the total amount of material passing through the drying unit may be reduced relative to a system in which all of the wet granules, including the undersize wet granules, exiting the granulator are fed to the drying unit. Reducing the amount of material that passes through the drying unit may reduce the amount of energy used by the drying unit to dry the material.

The dry granule material may be fed to a dry granule screener 132. The dry granule screener 132 may classify the dry granule material based on particle size. In one example, the dry granule screener 132 may separate the dry granule material into three portions (e.g., undersize dry granule material, product granule material, and oversize dry granule material) as shown in FIG. 1. The undersize dry granule material may include particles having a size that is smaller than the desired product size. In one example, the undersize dry granule material may have a particle size distribution of at least about 80% −10 mesh. The undersize dry granule material may exit the dry granule screener 132 and be fed to the granulator 126 as dry undersize recycle material as described above.

The particle size of the undersize dry granule material may be based on the desired particle size of the finished product granules. For example, the undersize dry granule material may have a particle size of at most about 67% of the particle size of the finished product granules. In one example, the particle size of the finished product granules may be about 3 mm. The undersize dry granule material may have a particle size of at most about 2 mm. The particle size of the undersize dry granule material and/or the particle size of the finished product granules may be a median particle size. Additionally, or alternatively, the undersize dry granule material may have a particle size distribution of at least about 75% less than or equal to about 67% of the particle size of the finished product granules, typically at least about 80% less than or equal to about 67% of the particle size of the finished product granules.

The oversize dry granule material may exit the dry granule screener 132 and be fed to the mill 114. The oversize dry granule material may include particles having a size that is larger than the desired product size. In one example, the oversize dry granule material may have a particle size distribution of at least about 98% +4 mesh. The mill 114 may reduce the particle size of the oversize dry granule material as described above with reference to the oversize feedstock material. Milled dry granule material may exit the mill 114 and be fed to the feed screener 112 to return the dry granule material to the feed screener 112 for further processing.

The particle size of the oversize dry granule material may be based on the desired particle size of the finished product granules. For example, the oversize dry granule material may have a particle size of at least about 150% of the particle size of the finished product granules. In one example, the particle size of the finished product granules may be about 3 mm. The oversize dry granule material may have a particle size of at least about 4.5 mm. The particle size of the oversize dry granule material and/or the particle size of the finished product granules may be a median particle size. Additionally, or alternatively, the oversize dry granule material may have a particle size distribution of at least about 75% greater than or equal to about 150% of the particle size of the finished product granules, typically at least about 80% greater than or equal to about 150% of the particle size of the finished product granules.

The product granule material may be fed to a product storage unit 134. The product storage unit 134 may include a tank or a vessel to store the product granule material. The product granule material may include particles having the desired size. In one example, the product granule material may have a particle size distribution of at least about 98%-4 mesh. Additionally, or alternatively, the dry granule material may have a particle size distribution of at most about 25% −8 mesh, typically at most about 20% −8 mesh, preferably at most about 16% −8 mesh.

In any of the examples described herein, the particle size distributions of the various materials may be variable and/or customizable (e.g., to meet the needs of a specific application). Additionally, or alternatively, the particle size distributions of the various materials may be based on the desired particle size of the finished granules as described herein. The finished granules may have any suitable particle size including, for example, between about 2.3 mm and about 4.8 mm (e.g., about 3 mm). In one example, the finished granules may conform to the Size Guide Number (SGN) custom (e.g., for fertilizer granules). Any or all of the materials described herein may be sized appropriately for a desired end use (e.g., blending, coating, or any other suitable use).

The bulk density of the product granule material may be at least about 55 lb/ft$^3$ poured and at least about 60 lb/ft$^3$ tapped, typically at least about 60 lb/ft$^3$ poured and at least about 60 lb/ft$^3$ tapped. For example, the bulk density of the product granule material may be between about 55 lb/ft$^3$ and about 62 lb/ft$^3$ poured and/or between about 58 lb/ft$^3$ and about 63 lb/ft$^3$ tapped. Additionally, or alternatively, the hardness, or average crush strength, of the product granule material may be at least about 9 lb measured with reference to a granule having a diameter of about 3 mm. For example, the hardness of the product granule material may be between about 9 lb and about 11 lb measured using a 3 mm granule.

The process described herein may enable the granules exiting the pan to be strong enough to be screened wet before going into the rotary dryer. This may reduce the amount of material that is dried because only product sized and oversize granules are sent to the dryer. Additionally, or alternatively, the granules formed may be easily blended with other granular materials (e.g., other granular fertilizers). For example, the size of the granules may be customized for a particular application so as to be blended without substantial segregation.

In one example, the process described herein may be utilized by the MOP compaction plant industry. For example, the high recycle rates of compaction plants may be greatly reduced by the incorporation of the process on the tail end of the compaction plant. In other words, material that would otherwise be recycled within the compaction plant may instead be granulated as described herein (e.g., may be used as feedstock for the system described herein). This may substantially reduce the amount of recycle associated with the compaction process and/or effectively increase the capacity of the compaction plant.

In one example, a polishing or "slicking" step may be employed to improve the surface finish of the dry granules. This step may include discharging the dry granules into a very smooth pan or drum rotating at a relatively high speed. A heated stream of air and a sufficient amount of solution to wet the surface of the granules may be added to the smooth pan or drum. The granules may be effectively slicked (e.g., by the granule to granule contact and/or the smoothness of the device). The resulting granules may have a slicked surface finish which is shiny and appears candy coated. Such a slicked surface may make a superior coatable material.

The granules produced as described herein may have a greater sphericity compared to granules produced using other granulation or agglomeration processes. This may enable the granules to have a decreased surface area relative to the volume of the granules. The granules may be coated using any suitable coating technique known in the art. Such granules may be used, for example, for timed release fertilizers, event release fertilizers, or animal feeds. The reduced surface area of the granules may minimize the amount of coating material that is required to coat the granules.

EXAMPLES

Example 1

A batch granulation is performed using an 11 in pan granulator. 1 lb of MOP seed particles is screened to −8 +14 Tyler and placed in the pan granulator set at a speed of 41 rpm and an angle of 50°. The particle size distribution of the seed particles is shown in Table 1.

TABLE 1

Particle Size Distribution of Seed Particles
Seed PSD

| Mesh Width (mm) | Mesh Width (Tyler) | Avg. Particle Diameter (mm) | Mass Retained (lb) | Mass Fraction | Cumulative Percent Passing |
|---|---|---|---|---|---|
| 2.38 | 8 | 2.595 | 0 | 0 | 100 |
| 1.68 | 10 | 1.68 | 0.76 | 76.2 | 23.8 |
| 1.2 | 14 | 1.2 | 0.24 | 23.8 | 0 |
|  |  |  | 1 |  |  |

A hand sifter is filled with 3.3 lb of −100 Tyler MOP powder. The particle size distribution of the MOP powder is shown in Table 2.

TABLE 2

Particle Size Distribution of MOP Powder
Powder PSD

| Mesh Width (mm) | Mesh Width (Tyler) | Avg. Particle Diameter (mm) | Mass Retained (lb) | Mass Fraction | Cumulative Percent Passing |
|---|---|---|---|---|---|
| 0.152 | 100 | >0.139 | 0 | 0 | 100 |
| 0.125 | 115 | 0.1385 | 0.4 | 36.725 | 63.275 |
| 0.104 | 150 | 0.1145 | 0.58 | 53.654 | 9.621 |
| 0.089 | 170 | 0.0965 | 0.02 | 1.573 | 8.048 |
| 0.075 | 200 | 0.082 | 0.02 | 1.85 | 6.198 |
| 0.066 | 250 | 0.0705 | 0.06 | 5.273 | 0.925 |
| 0.037 | pan | <0.055 | 0.01 | 0.925 | 0 |
|  |  |  | 1.08 |  |  |

0.373 lb of MOP is dissolved in 0.672 lb of water to form a binder solution. The binder solution is filtered and placed in a heated spray pot at 217° F. and 30 psi. The binder solution spray and MOP powder feed to the pan granulator are started simultaneously. The granulator runs for 5.5 min. Table 3 shows the operating parameters and the properties of the granules produced using the batch granulation of Example 1. 1.075 lb of granulated material is removed to dry and is not included in the weights given in Table 3. The bulk density of the dry granules produced using the batch granulation of Example 1 is shown in Table 4.

TABLE 3

Operating Parameters of Batch Granulation and Properties of Wet Granules

| | |
|---|---|
| Seed Weight | 1 lb |
| Powder Weight | 2.993 lb |
| Solution Recipe | 0.373 lb KCl/0.672 lb H$_2$O |
| Solution Concentration (wt KCl/wt water) | 55.5% |
| Solution Temperature | 217° F. |
| Pan Angle | 50° |
| Pan Speed | 41 rpm |
| Pan Diameter | 11 in |
| Pan Depth | 4.625 in |
| Start Time (min:sec) | 0:00 |
| Solids Application End Time (min:sec) | 5:30 |
| Nozzle Size | 650017 |
| Spray Pressure | 30 psi |
| Total Solution Sprayed | 0.881 lb |
| Over Size (+5 mesh) | 0.156 lb |
| Product Size (−5 +8 mesh) | 4.318 lb |
| Under Size (−8 mesh) | 0.122 lb |
| Stuck to Pan | 0.117 lb |
| Average Moisture Content | 11.3% |
| Average Dry Granule Hardness | 10.8 lb |

TABLE 4

Dry Granule Bulk Density

| Measurement No. | Untapped g/mL | Untapped lb/ft³ | Tapped g/mL | Tapped lb/ft³ |
|---|---|---|---|---|
| 1 | 0.935 | 58 | 0.921 | 57 |
| 2 | 0.932 | 58 | 0.913 | 57 |
| 3 | 0.921 | 57 | 0.908 | 57 |
| 4 | 0.932 | 58 | 0.92 | 57 |
| 5 | 0.934 | 58 | 0.924 | 58 |
| Avg | | 58.11 | | 57.26 |

Figure 3:
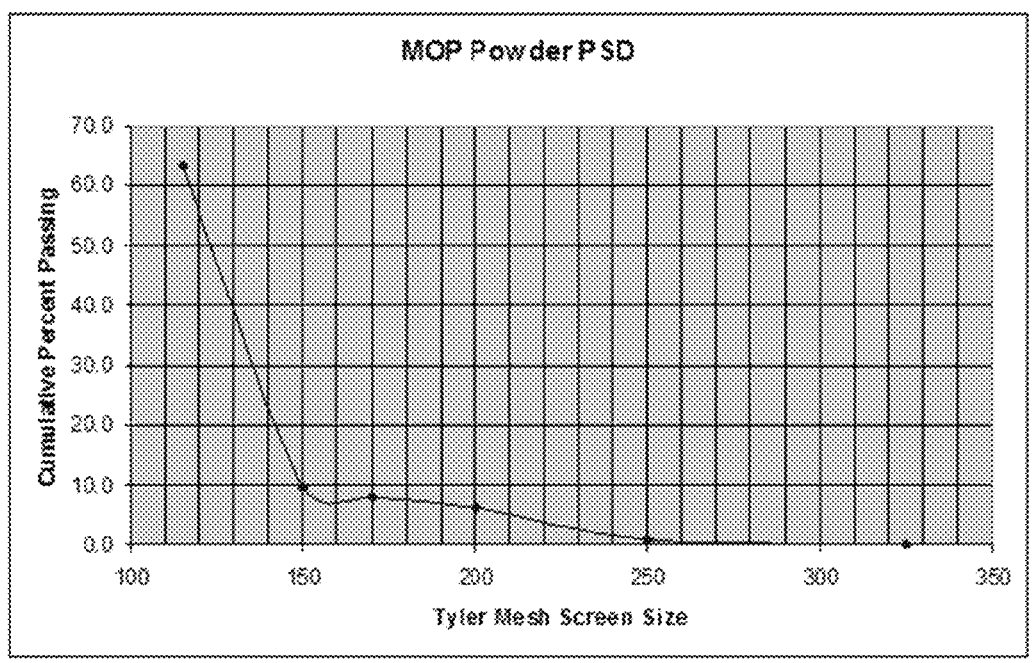
FIG. 3 illustrates a plot of the cumulative % passing vs. mesh size of the MOP powder used in the batch granulation of Example 1.
Figure 4:
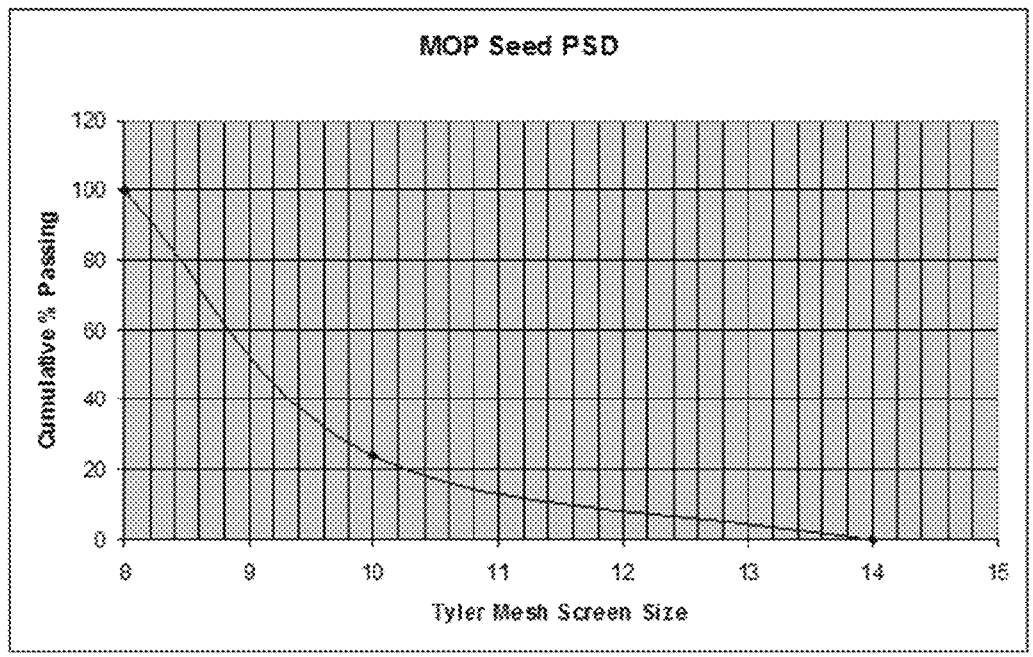
FIG. 4 illustrates a plot of the cumulative % passing vs. mesh size of the MOP seed used in the batch granulation of Example 1.
Figure 5:
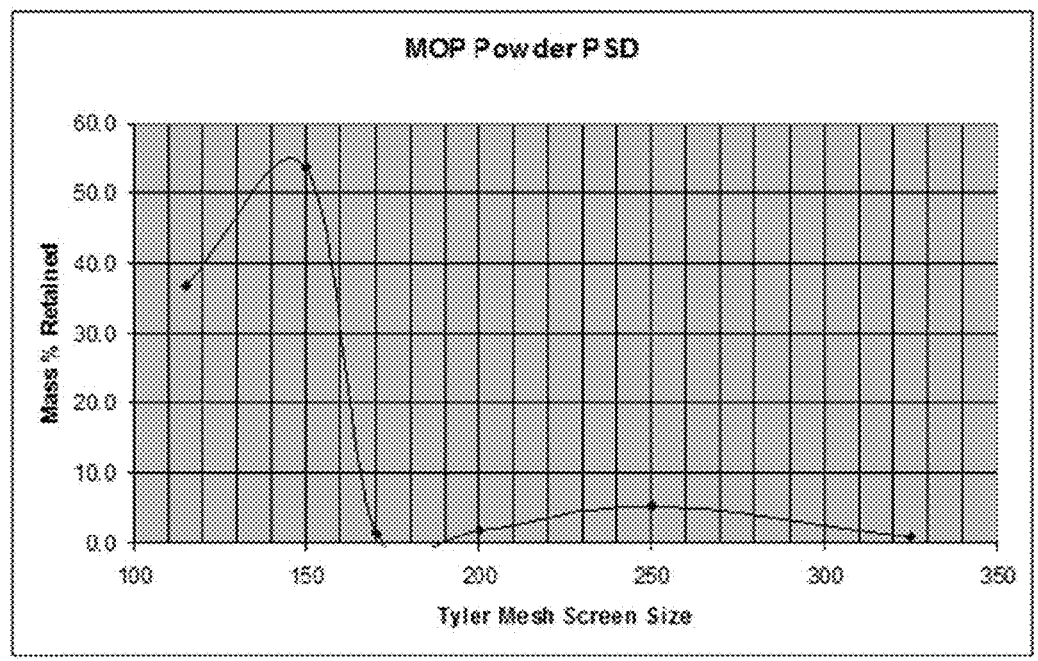
FIG. 5 illustrates a plot of the mass % retained vs. mesh size of the MOP powder used in the batch granulation of Example 1.
Figure 6:
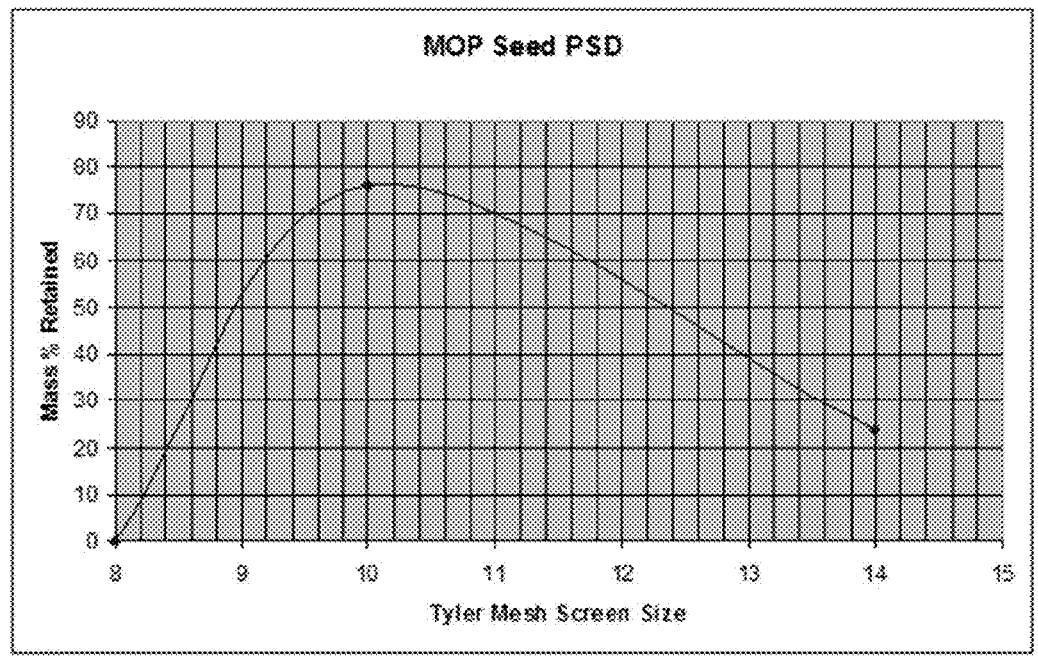
FIG. 6 illustrates a plot of the mass % retained vs. mesh size of the MOP seed used in the batch granulation of Example 1.

FIG. 3 illustrates a plot of the cumulative % passing vs. mesh size of the MOP powder used in the batch granulation of Example 1. FIG. 4 illustrates a plot of the cumulative % passing vs. mesh size of the MOP seed used in the batch granulation of Example 1. FIG. 5 illustrates a plot of the mass % retained vs. mesh size of the MOP powder used in the batch granulation of Example 1. FIG. 6 illustrates a plot of the mass % retained vs. mesh size of the MOP seed used in the batch granulation of Example 1.

Example 2

A continuous granulation is performed using a 36 in pan granulator. The pan granulator is set at a speed of 17 rpm and an angle of 50°. 29 lb of potash seed particles (e.g., MOP seed) is screened to −8 +16 Tyler. A weight belt feeder is filled with the −8 +16 Tyler seed. The particle size distribution of the seed particles is shown in Table 5.

TABLE 5

Particle Size Distribution of Seed Particles
Seed PSD

| Measurement No. | Mesh Width (mm) | Mesh Width (Tyler) | Avg. Particle Diameter (mm) | Mass Retained (lb) | Mass Fraction | Cumulative Fraction |
|---|---|---|---|---|---|---|
| 1 | 2.81 | 7 | >3.08 | 0 | 0 | 1 |
| | 2.38 | 8 | 2.595 | 0.03 | 0.037 | 0.963 |
| | 1.68 | 10 | 1.68 | 0.33 | 0.398 | 0.565 |
| | 1.2 | 14 | 1.2 | 0.36 | 0.434 | 0.131 |
| | 1 | 16 | 1.1 | 0.06 | 0.074 | 0.057 |
| | 0.853 | 20 | <0.926 | 0.05 | 0.057 | 0 |
| 2 | 2.81 | 7 | >3.08 | 0 | 0 | 1 |
| | 2.38 | 8 | 2.595 | 0.03 | 0.038 | 0.962 |
| | 1.68 | 10 | 1.68 | 0.26 | 0.366 | 0.597 |
| | 1.2 | 14 | 1.2 | 0.32 | 0.445 | 0.152 |
| | 1 | 16 | 1.1 | 0.06 | 0.086 | 0.065 |
| | 0.853 | 20 | <0.926 | 0.05 | 0.065 | 0 |
| 3 | 2.81 | 7 | >3.08 | 0 | 0 | 1 |
| | 2.38 | 8 | 2.595 | 0.02 | 0.028 | 0.972 |
| | 1.68 | 10 | 1.68 | 0.24 | 0.378 | 0.594 |
| | 1.2 | 14 | 1.2 | 0.28 | 0.435 | 0.159 |
| | 1 | 16 | 1.1 | 0.06 | 0.09 | 0.069 |
| | 0.853 | 20 | <0.926 | 0.04 | 0.069 | 0 |
| Avg | 2.81 | 7 | >3.08 | | 0 | |
| | 2.38 | 8 | 2.595 | | 0.034 | |
| | 1.68 | 10 | 1.68 | | 0.381 | |
| | 1.2 | 14 | 1.2 | | 0.438 | |
| | 1 | 16 | 1.1 | | 0.083 | |
| | 0.853 | 20 | <0.926 | | 0.064 | |

50 lb of −100 Tyler potash powder (e.g. MOP powder) is placed in a screw feeder. The particle size distribution of the potash powder is shown in Table 6.

TABLE 6

Particle Size Distribution of Potash Powder
Powder PSD

| Measurement No. | Mesh Width (mm) | Mesh Width (Tyler) | Avg. Particle Diameter (mm) | Mass Retained (lb) | Mass Fraction | Cumulative Fraction |
|---|---|---|---|---|---|---|
| 1 | 0.152 | 100 | >0.139 | 0 | 0 | 1 |
| | 0.125 | 115 | 0.1385 | 1.5 | 0.012 | 0.988 |
| | 0.104 | 150 | 0.1145 | 74.7 | 0.609 | 0.379 |
| | 0.089 | 170 | 0.0965 | 5 | 0.041 | 0.338 |
| | 0.075 | 200 | 0.082 | 9.38 | 0.077 | 0.261 |
| | 0.066 | 250 | 0.0705 | 11.83 | 0.096 | 0.165 |
| | 0.037 | pan | <0.055 | 20.2 | 0.165 | 0 |
| 2 | 0.152 | 100 | >0.139 | 0 | 0 | 1 |
| | 0.125 | 115 | 0.1385 | 2.25 | 0.017 | 0.983 |
| | 0.104 | 150 | 0.1145 | 80.18 | 0.618 | 0.364 |
| | 0.089 | 170 | 0.0965 | 4.81 | 0.037 | 0.327 |
| | 0.075 | 200 | 0.082 | 10.45 | 0.081 | 0.247 |
| | 0.066 | 250 | 0.0705 | 14.91 | 0.115 | 0.132 |
| | 0.037 | pan | <0.055 | 17.1 | 0.132 | 0 |
| 3 | 0.152 | 100 | >0.139 | 0 | 0 | 1 |
| | 0.125 | 115 | 0.1385 | 1.94 | 0.015 | 0.985 |
| | 0.104 | 150 | 0.1145 | 75.49 | 0.598 | 0.386 |
| | 0.089 | 170 | 0.0965 | 6.78 | 0.054 | 0.333 |
| | 0.075 | 200 | 0.082 | 8.85 | 0.07 | 0.262 |
| | 0.066 | 250 | 0.0705 | 13.12 | 0.104 | 0.158 |
| | 0.037 | pan | <0.055 | 19.98 | 0.158 | 0 |
| Avg | 0.152 | 100 | >0.139 | | 0 | |
| | 0.125 | 115 | 0.1385 | | 0.015 | |
| | 0.104 | 150 | 0.1145 | | 0.609 | |
| | 0.089 | 170 | 0.0965 | | 0.044 | |
| | 0.075 | 200 | 0.082 | | 0.076 | |
| | 0.066 | 250 | 0.0705 | | 0.105 | |
| | 0.037 | pan | <0.055 | | 0.152 | |

10.9 lb of potash is dissolved in 15.8 lb of water to form a binder solution. The binder solution is filtered and placed in a heated spray pot at 212° F. and 15 psi. The powder screw feeder, the seed belt feeder, and the spray pot are all started at the same time. The plant is run for 1.5 hr total. The seed feeder is run at 24.36 lb/hr. The powder feeder is run at 114.65 lb/hr. The spray pot is run at 19.71 lb/hr. The average wet granule moisture content is 8.23%. The average dry granule crush strength from the dryer is 11 lb/granule. The average dry granule crush strength after 72 hr on the counter (e.g., at ambient conditions) is 9.1 lb/granule. The particle size distribution of the wet granules is as follows: 15.1 lb of oversize (+5 mesh) granules, 92.05 lb of product size (−5 +8 mesh) granules, 28.15 lb of undersize (−8 mesh) granules, and 26 lb stuck to the pan. The bulk density of the seed particles is shown in Table 7. The bulk density of the potash powder is shown in Table 8. The bulk density of the dry granules produced using the continuous granulation of Example 2 is shown in Table 9. The particle size distribution of the wet granules is shown in Table 10. The particle size distribution of the dry granules is shown in Table 11.

TABLE 7

Seed Particle Bulk Density

| Measurement No. | Seed Particle Bulk Density | | | |
|---|---|---|---|---|
| | Untapped | | Tapped | |
| | g/mL | lb/ft³ | g/mL | lb/ft³ |
| 1 | 0.994 | 62.08 | 1.054 | 65.8 |
| 2 | 1.015 | 63.34 | 1.049 | 65.5 |
| 3 | 0.997 | 62.25 | 1.082 | 67.54 |
| 4 | 1.009 | 62.99 | 1.081 | 67.49 |
| 5 | 0.982 | 61.28 | 1.07 | 66.8 |
| Avg | | 62.39 | | 66.62 |

TABLE 8

Potash Powder Bulk Density

| Measurement No. | Potash Powder Bulk Density | | | |
|---|---|---|---|---|
| | Untapped | | Tapped | |
| | g/mL | lb/ft³ | g/mL | lb/ft³ |
| 1 | 0.748 | 46.69 | 0.996 | 62.2 |
| 2 | 0.748 | 46.66 | 0.997 | 61.02 |
| 3 | 0.917 | 57.23 | 0.98 | 61.18 |
| 4 | 0.776 | 48.43 | 0.961 | 59.99 |
| 5 | 0.837 | 52.24 | 0.968 | 60.4 |
| Avg | | 50.25 | | 60.96 |

TABLE 9

Dry Granule Bulk Density

| Measurement No. | Dry Granule Bulk Density | | | |
|---|---|---|---|---|
| | Untapped | | Tapped | |
| | g/mL | lb/ft³ | g/mL | lb/ft³ |
| 1 | 0.961 | 60 | 0.972 | 61 |
| 2 | 0.976 | 61 | 0.998 | 62 |
| 3 | 0.994 | 62 | 1.006 | 63 |
| 4 | 0.991 | 62 | 0.964 | 60 |
| 5 | 0.977 | 61 | 0.975 | 61 |
| Avg | | 61.17 | | 61.37 |

TABLE 10

Particle Size Distribution of Wet Granules

| Measurement No. | Mesh Width (Tyler) | Granule PSD (lb) | % of total |
|---|---|---|---|
| 1 | 5 | 0.022 | 2.83 |
| | 6 | 0.096 | 12.36 |
| | 7 | 0.386 | 49.68 |
| | 8 | 0.237 | 30.5 |
| | pan | 0.036 | 4.63 |
| | Total | 0.777 | |
| 2 | 5 | 0.017 | 1.87 |
| | 6 | 0.104 | 11.42 |
| | 7 | 0.421 | 46.21 |
| | 8 | 0.327 | 35.89 |
| | pan | 0.042 | 4.61 |
| | Total | 0.911 | |

TABLE 11

Particle Size Distribution of Dry Granules

| Mesh Width (Tyler) | Granule PSD (lb) | % of total |
|---|---|---|
| 5 | 0.011 | 0.65 |
| 6 | 0.13 | 7.68 |
| 7 | 0.548 | 32.39 |
| 8 | 0.743 | 43.91 |
| pan | 0.26 | 15.37 |
| Total | 1.692 | |

Figure 7:
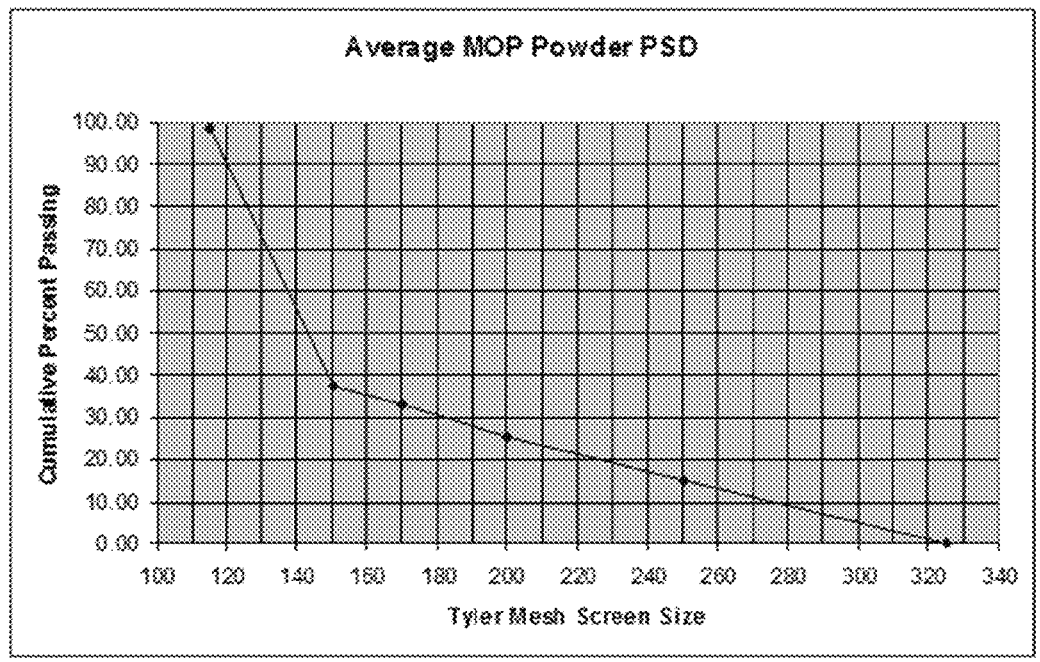
FIG. 7 illustrates a plot of the cumulative % passing vs. mesh size of the MOP powder used in the continuous granulation of Example 2.
Figure 8:
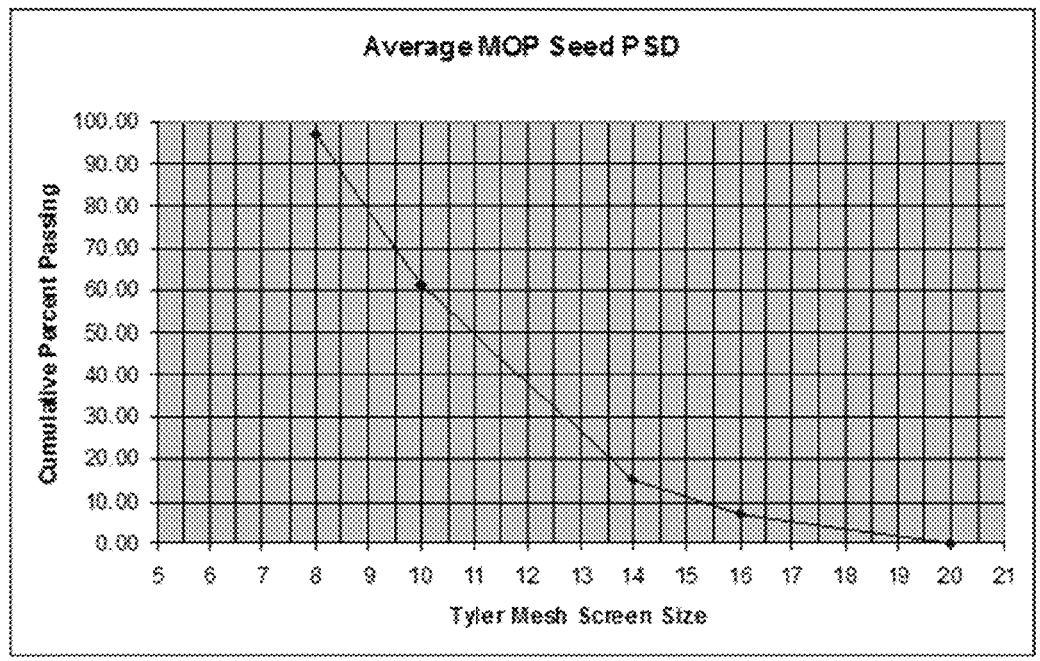
FIG. 8 illustrates a plot of the cumulative % passing vs. mesh size of the MOP seed used in the continuous granulation of Example 2.
Figure 9:
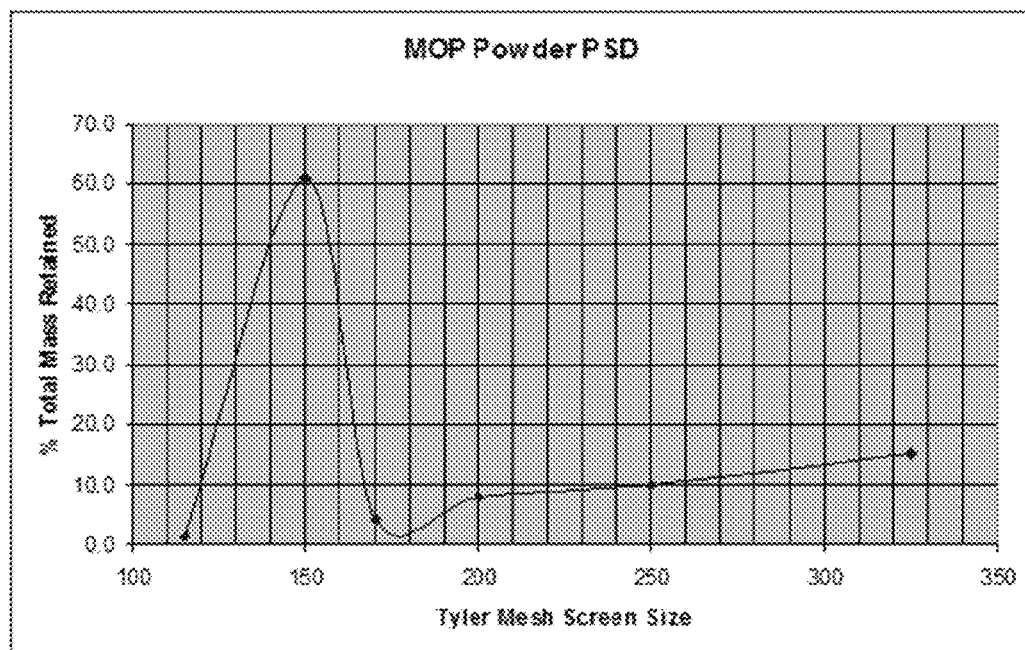
FIG. 9 illustrates a plot of the % mass retained vs. mesh size of the MOP powder used in the continuous granulation of Example 2.
Figure 10:
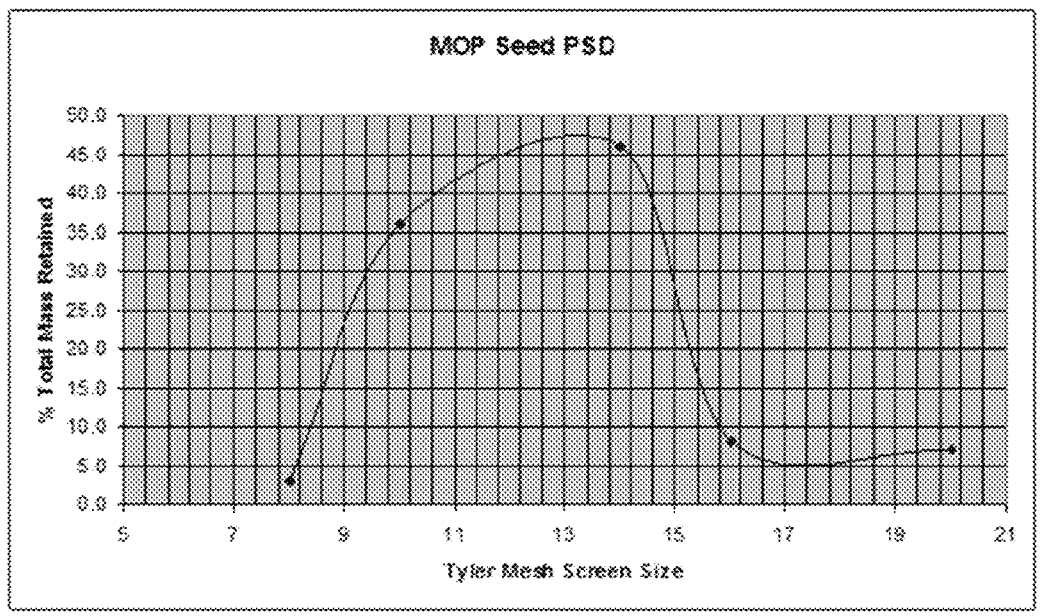
FIG. 10 illustrates a plot of the % mass retained vs. mesh size of the MOP seed used in the continuous granulation of Example 2.

FIG. 7 illustrates a plot of the cumulative % passing vs. mesh size of the MOP powder used in the continuous granulation of Example 2. FIG. 8 illustrates a plot of the cumulative % passing vs. mesh size of the MOP seed used in the continuous granulation of Example 2. FIG. 9 illustrates a plot of the % mass retained vs. mesh size of the MOP powder used in the continuous granulation of Example 2. FIG. 10 illustrates a plot of the % mass retained vs. mesh size of the MOP seed used in the continuous granulation of Example 2.

Example 3

A batch granulation is performed in a 12 in pan granulator. 0.5 lb of 36-3-6 NPK seed particles is screened to −10+20 Tyler and placed in the pan granulator set at a speed of 30 rpm and an angle of 55°. 0.088 lb of MOP is dissolved in 0.16 lb of water to form a binder solution. The binder solution is placed in a heated spray pot at 220° F. and 30 psi. 1.543 lb of NPK powder mix is placed in a bucket to be introduced into the granulator by spoon. Solution spray is started and runs initially for 10 seconds. An appropriate amount of powder is placed in the rolling bed to form round particles and to keep the bed dry and rolling. The particles are allowed to roll for approximately 2 minutes. The solution spray is started again and run until empty. The rest of the powder charge is added to the rolling bed while the spray is running. The granulator runs for approximately 10 minutes. Half of the resulting granules is bagged wet and the other half is left in the granulator to be dried. The granules are dried in the same pan at the same speed with a heat gun and Bunsen burner. The burner is pointed toward the pan shell. The wet granule moisture content is 7.5%. The average dry granule crush strength of a 3 mm granule from the dryer is 6.9 lb. The total solution used is 0.248 lb. The particle size distribution of the dry granules is as follows: 0.185 lb of oversize (+5 mesh) granules, 0.334 lb of product size (−5+8 mesh) granules, and 0.424 lb of undersize (−8 mesh) granules. The particle size distribution of the seed particles is shown in Table 12. The particle size distribution of the powder is shown in Table 13.

TABLE 12

Particle Size Distribution of Seed Particles

| Mesh Width (Tyler) | Granule PSD (lb) |
|---|---|
| 14 | 0.3 |
| 16 | 0.1 |
| 20 | 0.1 |

TABLE 13

Particle Size Distribution of Powder

| Mesh Width (Tyler) | Granule PSD (lb) |
|---|---|
| 100 | 0.091 |
| 115 | 0.133 |
| 150 | 0.102 |
| 170 | 0.104 |
| 200 | 0.035 |
| 250 | 0.03 |
| Pan | 0.022 |

Figure 11:
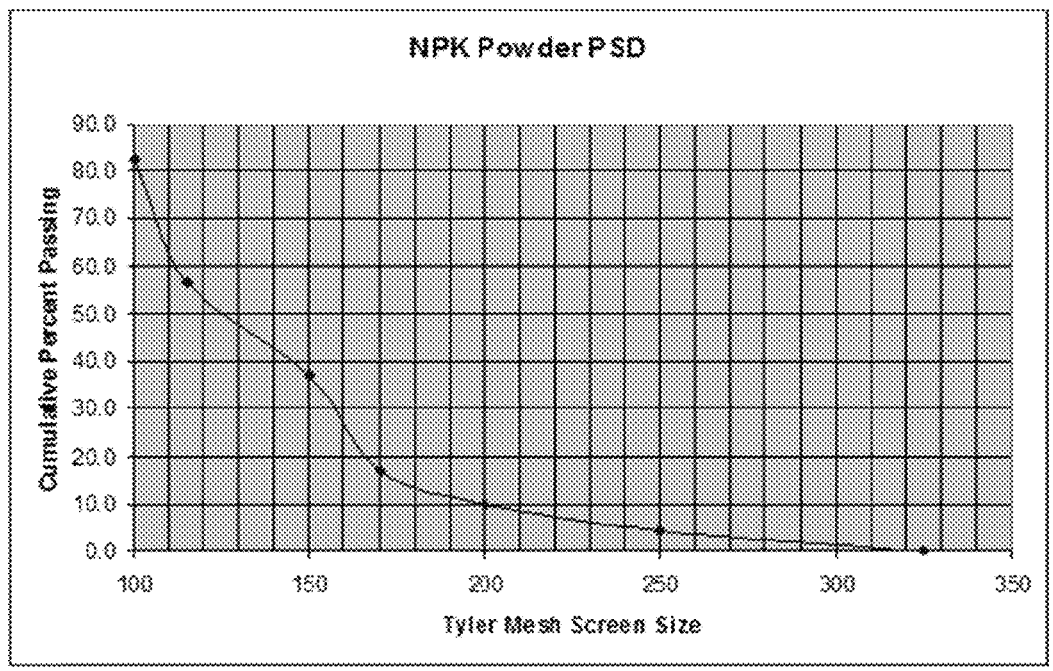
FIG. 11 illustrates a plot of the cumulative % passing vs. mesh size of the NPK powder used in the batch granulation of Example 3.
Figure 12:
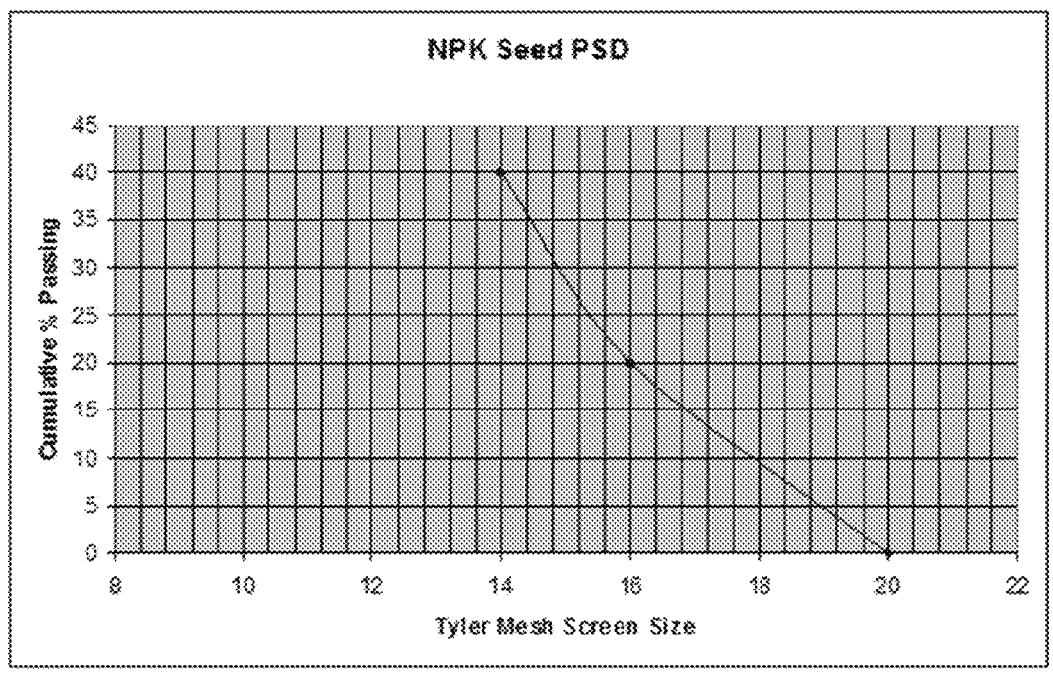
FIG. 12 illustrates a plot of the cumulative % passing vs. mesh size of the NPK seed used in the batch granulation of Example 3.
Figure 13:
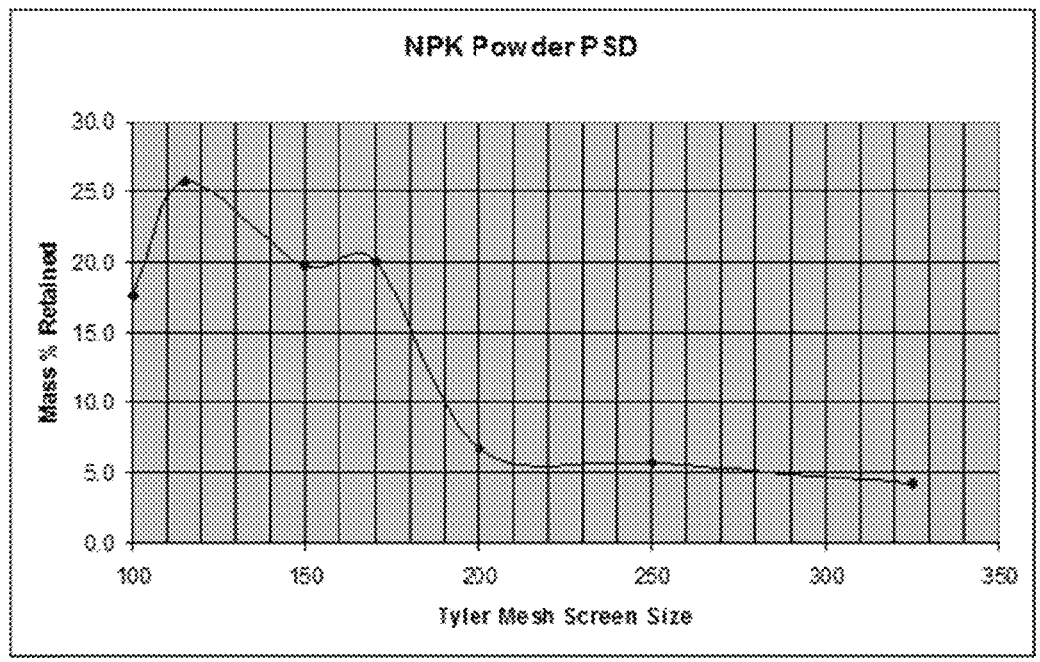
FIG. 13 illustrates a plot of the mass % retained vs. mesh size of the NPK powder used in the batch granulation of Example 3.
Figure 14:
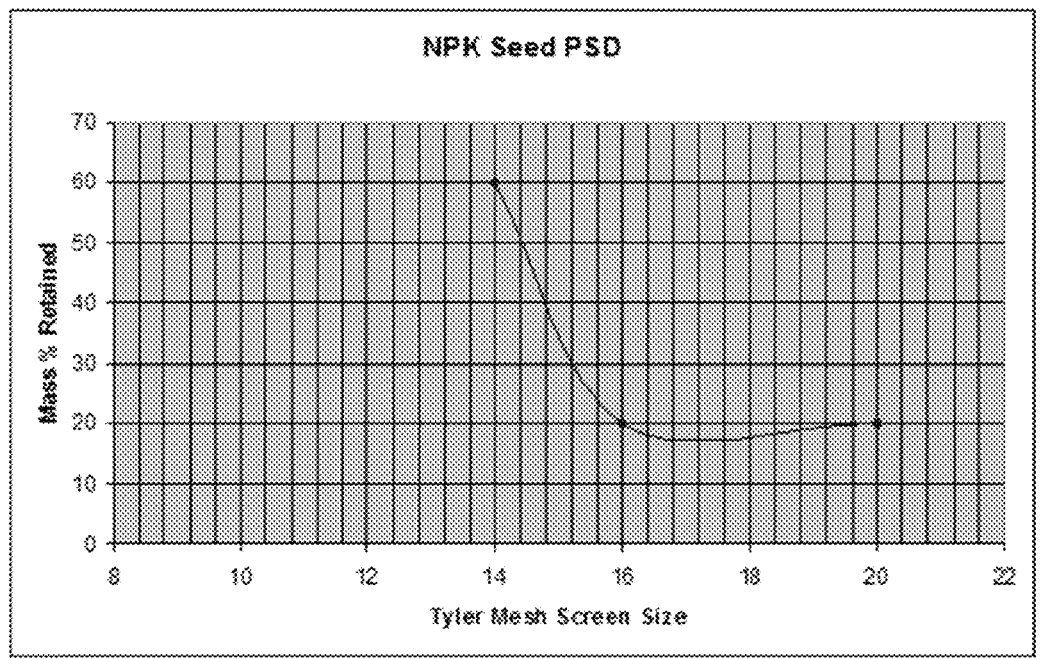
FIG. 14 illustrates a plot of the mass % retained vs. mesh size of the NPK seed used in the batch granulation of Example 3.
Figure 15:
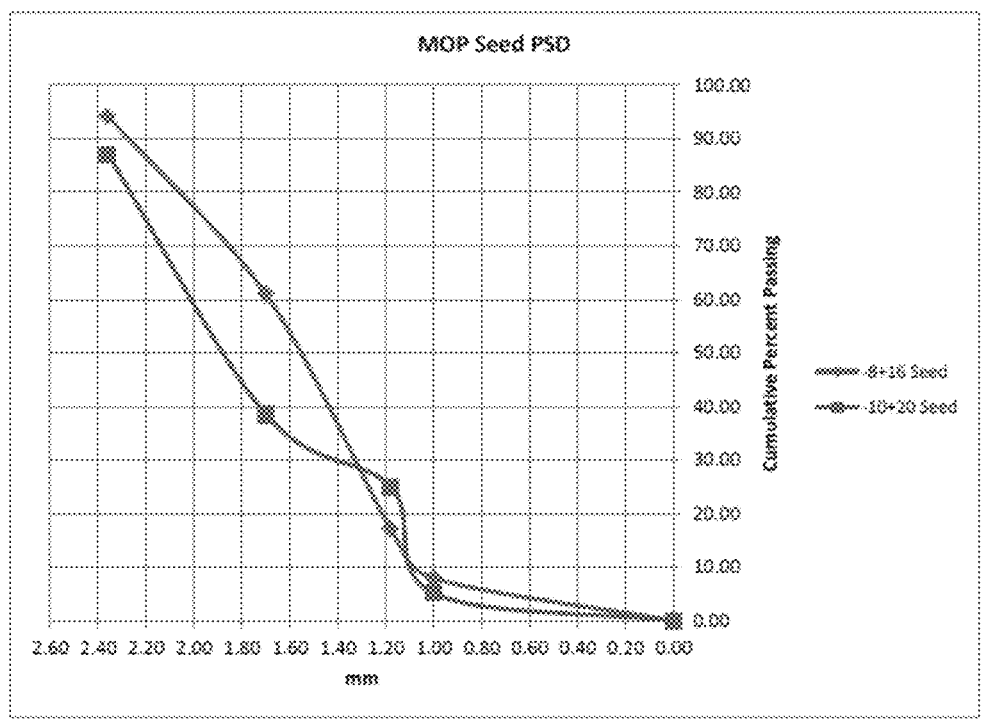
FIG. 15 illustrates a plot of the cumulative % passing vs. mesh size of the MOP seed used in the batch granulation of Example 4.
Figure 16:
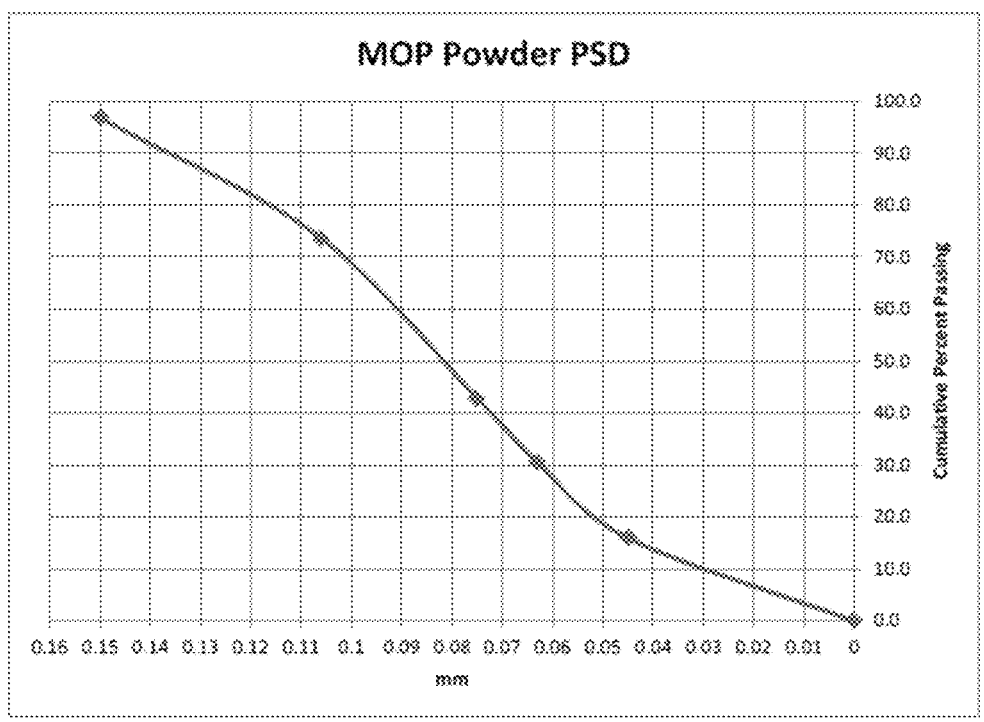
FIG. 16 illustrates a plot of the cumulative % passing vs. mesh size of the MOP powder used in the batch granulation of Example 4.
Figure 17:
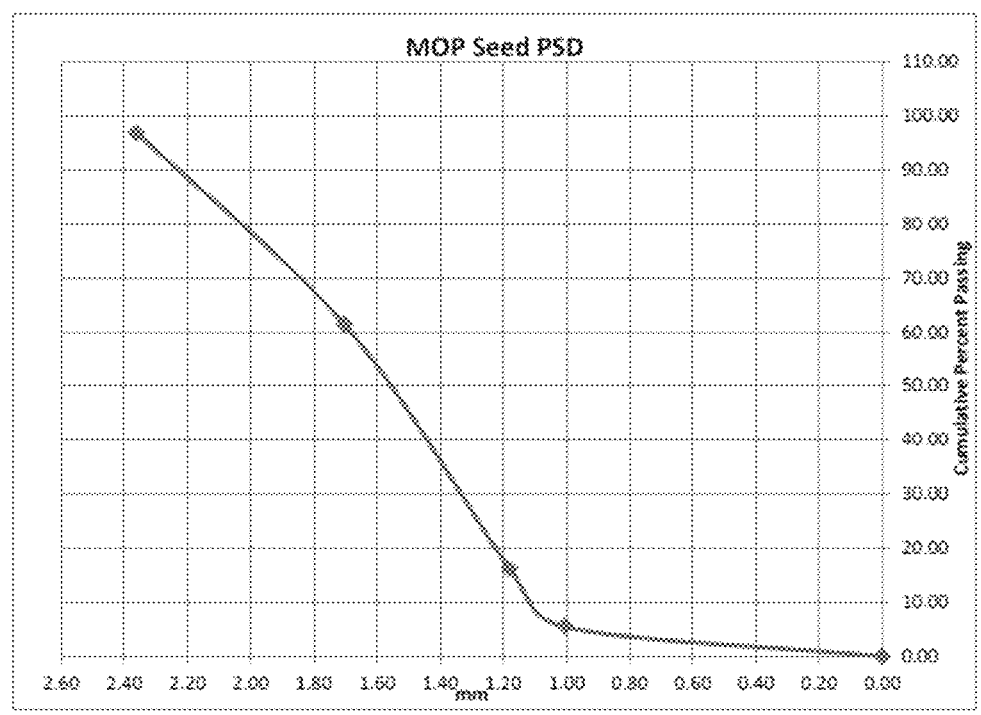
FIG. 17 illustrates a plot of the cumulative % passing vs. mesh size of the MOP seed used in the batch granulation of Example 5.
Figure 18:
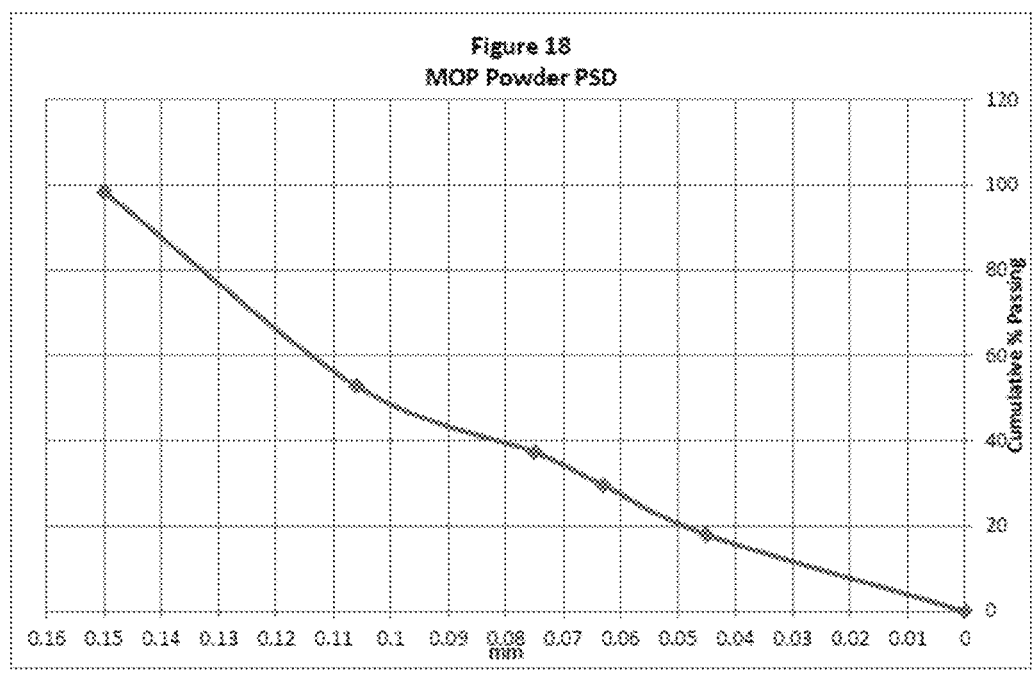
FIG. 18 illustrates a plot of the cumulative % passing vs. mesh size of the MOP powder used in the batch granulation of Example 4.

FIG. 11 illustrates a plot of the cumulative % passing vs. mesh size of the NPK powder used in the batch granulation of Example 3. FIG. 12 illustrates a plot of the cumulative % passing vs. mesh size of the NPK seed used in the batch granulation of Example 3. FIG. 13 illustrates a plot of the mass % retained vs. mesh size of the NPK powder used in the batch granulation of Example 3. FIG. 14 illustrates a plot of the mass % retained vs. mesh size of the NPK seed used in the batch granulation of Example 3.

Example 4

A continuous granulation was performed using a 36" pan granulator. The pan was set at 14 rpm's and an angle of 55°. A belt feeder is filled with −10 +20 seed particles. The particle size distribution is shown in Table 14A. A screw feeder is then filled with graded powder mix. The particle size distribution of the graded powder is shown in Table 15. 12.8 lbs of potash was dissolved in 23.4 lbs of water to form a binder solution. The solution is heated until dissolved and then filtered. The solution is then weighed before being placed in a heated spray pot at 212° F. and 17 PSI. 28.19 lbs of bed material was placed in the rotating pan. The powder screw feeder, the seed belt, and the spray pot were all started at the same time. A timer was started. Feed rates and spray pressures were recorded throughout the experiment. Samples were taken every five minutes after steady state was reached. Forty minutes into the test, the −10 +20 seed was replaced with −8 +16 seed. This second seed PSD is located in Table 14B. The test was run for a total of 55 minutes. The seed feeder ran a total of 31.2 lbs of seed; 24.47 lbs -10 +20 and 6.735 lbs −8 +16 (34 lbs/hr). The powder feeder ran a total of 138 lbs of powder (150.5 lbs/hr). The solution spray pot fed a total of 30.24 lbs of solution (33 lbs/hr). The average wet granule moisture content was 9.8%. The average dry granule crush strength was 10.9 lbs. The particle size distribution of the wet granules was as follows: 1.045 lbs of oversize (+5 mesh) granules, 95.91 lbs of product size (−5 +8 mesh) granules, 53.67 lb undersize (−8 mesh) granules, and 37 lbs stuck to the pan. The wet granule and dry granule particle size distributions are given in Tables 16 and 17, respectively.

TABLE 14A

Particle Size Distribution of −8 + 16 Seeds

| Mesh | Mm | Mass Retained | % Retained | Cumulative % Passing |
|---|---|---|---|---|
| 8 | 2.360 | 0.034 | 12.93 | 87.07 |
| 10 | 1.700 | 0.196 | 48.55 | 38.52 |
| 14 | 1.180 | 0.257 | 13.50 | 25.02 |
| 16 | 1.000 | 0.054 | 19.87 | 5.15 |
| Pan | 0.000 | 0.047 | 5.15 | 0.00 |
| | | 0.588 | | |

TABLE 14B

Particle Size Distribution of −10 + 20 Seeds

| Mesh | Mm | Mass Retained | % Retained | Cumulative % Passing |
|---|---|---|---|---|
| 8 | 2.360 | 0.138 | 12.93 | 87.07 |
| 10 | 1.700 | 0.518 | 48.55 | 38.52 |
| 14 | 1.180 | 0.144 | 13.50 | 25.02 |
| 16 | 1.000 | 0.212 | 19.87 | 5.15 |
| Pan | 0.000 | 0.055 | 5.15 | 0.00 |
| | | 1.067 | | |

TABLE 15

Particle Size Distribution of Powder

| Mesh | Mm | Mass Retained | % Retained | Cumulative % Passing |
|---|---|---|---|---|
| 100 | 0.150 | 4.50 | 3.2 | 96.8 |
| 150 | 0.106 | 32.35 | 23.2 | 73.6 |
| 200 | 0.075 | 42.96 | 30.8 | 42.8 |
| 250 | 0.063 | 17.19 | 12.3 | 30.5 |
| 325 | 0.045 | 20.32 | 14.6 | 16.0 |
| Pan | 0.000 | 22.32 | 16.0 | 0.0 |
| | | 139.60 | | |

TABLE 16

Particle Size Distribution of Wet Granules

| Mesh | Mm | Mass Retained | % Retained | Cumulative % Passing |
|---|---|---|---|---|
| 5 | 4.00 | 0 | 0.00 | 100.00 |
| 6 | 3.35 | 0.043 | 4.23 | 95.77 |
| 7 | 2.80 | 0.331 | 32.58 | 63.19 |
| 8 | 2.36 | 0.461 | 45.37 | 17.81 |
| Pan | 0.00 | 0.181 | 17.81 | 0.00 |
| | | 1.016 | | |

TABLE 17

Particle Size Distribution of Dried Granules

| Mesh | Mm | Mass Retained | % Retained | Cumulative % Passing |
|---|---|---|---|---|
| 5 | 4.00 | 0 | 0.00 | 100.00 |
| 6 | 3.35 | 0.027 | 3.08 | 96.92 |
| 7 | 2.80 | 0.211 | 24.09 | 72.83 |

TABLE 17-continued

Particle Size Distribution of Dried Granules

| Mesh | Mm | Mass Retained | % Retained | Cumulative % Passing |
|---|---|---|---|---|
| 8 | 2.36 | 0.369 | 42.12 | 30.71 |
| Pan | 0.00 | 0.269 | 30.71 | 0.00 |
| | | 0.876 | | |

Example 5

A continuous granulation was performed using a 36 inch pan granulator. The pan was set at 14 rpm's and at an angle of 55°. A belt feeder is filled with −8 +16 seed particles. The particle size distribution is shown in Table 18. A screw feeder is then filled with graded powder mix. The particle size distribution of the graded powder is shown in Table 19. 10.04 lbs of potash was dissolved in 23.4 lbs of water to form a binder solution. The solution is heated until dissolved and then filtered. It is then weighed before being placed in a heated spray pot at 212° F. and 20 PSI. 21.625 lbs of bed material was placed in the rotating pan. The powder screw feeder, the seed belt, and the spray pot were all started at the same time. A timer was started. Feed rates and spray pressures were recorded throughout the experiment. Samples were taken every five minutes after steady state was reached. The test was run for a total of 63 minutes. The seed feeder ran a total of 35.185 lbs of seed (33.5 lbs/hr.). The powder feeder ran a total of 130 lbs of powder (123.8 lbs/hr.). The solution spray pot fed a total of 30.525 lbs of solution (29.07 lbs/hr.). The average wet granule moisture content was 10.65%. The average dry granule crush strength was 10.2 lbs. The particle size distribution of the wet granules was as follows: 1.585 lbs of oversize (+5 mesh) granules, 140.05 lbs of product size (−5+8 mesh) 5.985 lbs of undersize (−8 mesh) granules, and 15 lbs stuck to the pan. The wet granule and dry granule particle size distributions are given in Tables 20 and 21, respectively.

TABLE 18

Particle Size Distribution of −8 + 16 Seeds

| Mesh | Mm | Mass Retained | % Retained | Cumulative % Passing |
|---|---|---|---|---|
| 8 | 2.360 | 0.022 | 3.22 | 96.78 |
| 10 | 1.700 | 0.243 | 35.58 | 61.20 |
| 14 | 1.180 | 0.307 | 44.95 | 16.25 |
| 16 | 1.000 | 0.074 | 10.83 | 5.42 |
| Pan | 0.000 | 0.037 | 5.42 | 0.00 |
| | | 0.683 | | |

TABLE 19

Particle Size Distribution of Powder

| Mesh | Mm | Mass Retained | % Retained | Cumulative % Passing |
|---|---|---|---|---|
| 100 | 0.150 | 2.95 | 1.6 | 98.4 |
| 150 | 0.106 | 83.825 | 45.5 | 52.9 |
| 200 | 0.075 | 28.475 | 15.5 | 37.4 |
| 250 | 0.063 | 14.405 | 7.8 | 29.6 |
| 325 | 0.045 | 21.515 | 11.7 | 17.9 |
| Pan | 0.000 | 32.92 | 17.9 | 0 |
| | | 184.09 | | |

TABLE 20

Particle Size Distribution of Wet Granules

| Mesh | Mm | Mass Retained | % Retained | Cumulative % Passing |
|---|---|---|---|---|
| 5 | 4.00 | 0 | 0.00 | 100.00 |
| 6 | 3.35 | 0.216 | 20.30 | 79.70 |
| 7 | 2.80 | 0.637 | 59.87 | 19.83 |
| 8 | 2.36 | 0.173 | 16.26 | 3.57 |
| Pan | 0.00 | 0.038 | 3.57 | 0.00 |
| | | 1.064 | | |

TABLE 21

Particle Size Distribution of Dry Granules

| Mesh | Mm | Mass Retained | % Retained | Cumulative % Passing |
|---|---|---|---|---|
| 5 | 4.00 | 0 | 0.00 | 100.00 |
| 6 | 3.35 | 0.062 | 7.26 | 92.74 |
| 7 | 2.80 | 0.443 | 51.87 | 40.87 |
| 8 | 2.36 | 0.234 | 27.40 | 13.47 |
| Pan | 0.00 | 0.115 | 13.47 | 0.00 |
| | | 0.854 | | |

While various embodiments of the invention have been described, the invention is not to be restricted except in light of the attached claims and their equivalents. Drawings in the figures illustrating various embodiments are not necessarily to scale. Some drawings may have certain details magnified for emphasis, and any different numbers or proportions of parts should not be read as limiting unless so-designated in the present disclosure. Those skilled in the art will appreciate that embodiments not expressly illustrated herein may be practiced within the scope of the present invention, including those features described herein for different embodiments, which may be combined with each other and/or with currently-known or future-developed technologies while remaining within the scope of the claims presented herein. Moreover, the advantages described herein are not necessarily the only advantages of the invention and it is not necessarily expected that every embodiment of the invention will achieve all of the advantages described.

We claim:

1. A granulation method comprising:
    feeding a graded powder into a granulator, the graded powder comprising a particle size distribution of at least about 98%-115 mesh and at most about 50% -200 mesh;
    feeding a liquid binder into the granulator; and
    discharging from the granulator wet granules comprising a moisture content of between about 7% and about 9%.

2. The granulation method of claim 1, wherein the graded powder comprises a particle size distribution of between about 40% and about 80%-100+150 mesh, between about 5% and about 30%-150+200 mesh, and between about 10% and about 40%-200+325 mesh.

3. The granulation method of claim 1, further comprising feeding a seed material into the granulator, the seed material comprising a particle size distribution of at least about 97%-8 mesh and at most about 7%-16 mesh.

4. The granulation method of claim 3, wherein, a feed rate of the graded powder is between about 3 and about 8 times a feed rate of the liquid binder, and a feed rate of the seed material is between about 0.5 and about 3 times the feed rate of the liquid binder.

5. The granulation method of claim 1, wherein the liquid binder comprises a saturated solution.

6. The granulation method of claim 1, further comprising screening the wet granules.

7. The granulation method of claim 6, wherein screening the wet granules comprises separating undersize wet granule material from product/oversize wet granule material.

8. The granulation method of claim 7, further comprising feeding the product/oversize wet granule material to a drying unit without feeding the undersize wet granule material to the drying unit.

9. The granulation method of claim 7, further comprising feeding the undersize wet granule material to the granulator without first drying the wet granule material.

10. The granulation method of claim 1, further comprising drying at least a portion of the wet granules to form dry granules.

11. The granulation method of claim 10, wherein the dry granules comprise a crush strength of at least about 9 lb measured with reference to a 3 mm particle.

12. The granulation method of claim 10, wherein the dry granules comprise a bulk density of at least about 55 lb/ft$^3$ poured and at least about 60 lb/ft$^3$ tapped.

13. A granulation method comprising:
feeding a graded powder into a granulator, the graded powder comprising a particle size distribution of between about 40% and about 80% −100+150 mesh, between about 5% and about 30% −150 +200 mesh, and between about 10% and about 40% −200+325 mesh;
feeding a liquid binder into the granulator; and
discharging from the granulator a wet granule material.

14. The granulation method of claim 13, further comprising feeding a seed material into the granulator, the seed material comprising a particle size distribution of at least about 97% −8 mesh and at most about 7% −16 mesh.

15. The granulation method of claim 13, wherein the graded powder comprises at least one of nitrogen, phosphorus, or potassium.

16. The granulation method of claim 15, wherein the graded powder comprises potassium chloride and the liquid binder comprises a saturated potassium chloride solution.

17. The granulation method of claim 13, further comprising classifying the wet granule material based on particle size, wherein, during the classifying step, the wet granule material comprises a moisture content of between about 7% and about 9%.

18. The granulation method of claim 17, wherein the wet granule material comprises product/oversize wet granule material and undersize wet granule material, classifying the wet granule material comprises separating the product/oversize wet granule material and the undersize wet granule material from one another, and the granulation method further comprises feeding the product/oversize wet granule material to a drying unit without feeding the undersize wet granule material to the drying unit.

19. The granulation method of claim 13, further comprising drying at least a portion of the wet granule material in a drying unit to produce dry granule material, and slicking a surface of the dry granule material.

20. A granulation method for producing product granules having a median product particle size, the method comprising:
feeding a graded powder into a granulator, the graded powder comprising a particle size distribution of at least about 98% less than or equal to about 4.2% of the median product particle size and at most about 50% less than or equal to about 2.5% of the median product particle size;
feeding a liquid binder into the granulator; and
discharging from the granulator wet granules comprising a moisture content of between about 7% and about 9%.

21. A granulation method for producing product granules having a median product particle size, the method comprising:
feeding a graded powder into a granulator, the graded powder comprising a particle size distribution of between about 40% and about 80% between about 3% and about 6% of the median product particle size, between about 5% and about 30% between about 2% and about 4% of the median product particle size, and between about 10% and about 40% between about 1% and about 3% of the median product particle size;
feeding a liquid binder into the granulator; and
discharging from the granulator a wet granule material.

* * * * *